(12) United States Patent
Ishii et al.

(10) Patent No.: US 9,458,885 B2
(45) Date of Patent: Oct. 4, 2016

(54) SLIDING BEARING AND IMAGE FORMING APPARATUS

(71) Applicant: NTN CORPORATION, Osaka (JP)

(72) Inventors: Takuya Ishii, Mie (JP); Ikuma Fujitsuka, Mie (JP); Kei Hattori, Mie (JP); Kazuo Hirose, Mie (JP); Satoru Fukuzawa, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/346,675

(22) PCT Filed: Sep. 20, 2012

(86) PCT No.: PCT/JP2012/074035
§ 371 (c)(1),
(2) Date: Mar. 21, 2014

(87) PCT Pub. No.: WO2013/042715
PCT Pub. Date: Mar. 28, 2013

(65) Prior Publication Data
US 2014/0226927 A1    Aug. 14, 2014

(30) Foreign Application Priority Data

Sep. 22, 2011  (JP) ................................ 2011-208040
Dec. 19, 2011  (JP) ................................ 2011-277563

(51) Int. Cl.
*F16C 33/02* (2006.01)
*F16C 33/20* (2006.01)
(Continued)

(52) U.S. Cl.
CPC ............ *F16C 33/201* (2013.01); *F16C 13/02* (2013.01); *F16C 17/22* (2013.01); *F16C 23/045* (2013.01);
(Continued)

(58) Field of Classification Search
CPC ........ F16C 13/02; F16C 23/02; F16C 23/04; F16C 23/043; F16C 23/045; F16C 33/12; F16C 33/20; F16C 33/201; F16C 2370/38
USPC ....... 384/129, 192, 206–212, 275, 276, 280, 384/295, 296, 418
See application file for complete search history.

(56) References Cited

U.S. PATENT DOCUMENTS 3,461,529 A * 8/1969 Van Dorn ..................... 384/129
4,765,757 A   8/1988 Hartl
(Continued)

FOREIGN PATENT DOCUMENTS

DE    3818633 A1    6/1989
EP    1806512 A1   10/2007
(Continued)

OTHER PUBLICATIONS
Translation of WO2012/117938 obtained Mar. 12, 2015.*
(Continued)

*Primary Examiner* — James Pilkington
(74) *Attorney, Agent, or Firm* — Hedman & Costigan, P.C.; James V. Costigan; Kathleen A. Costigan

(57) ABSTRACT

A radial sliding bearing provided with a sliding bearing (1), an inner ring (2), and an outer ring (3), the inner ring (2) is made of melt-cast metal and the outer ring (3) being constituted by an article molded from a resin composition, the inner ring (2) comprising a concavely curved surface (2a) on part of the axial direction of the outer circumference and a bearing hole (4) for mating with a support shaft on the inner circumference, the outer ring (3) having a convexly curved surface (3a) that contacts and slides against the concavely curved surface (2a) on the outer circumference of the inner ring (2) along part of the axial direction of the inner circumference, and the inner ring (2) and the outer ring (3) relatively rotating without contacting each other apart from the contact between the convexly curved surface and the concavely curved surface.

17 Claims, 17 Drawing Sheets

(51) Int. Cl.

| | | |
|---|---|---|
| *G03G 21/16* | (2006.01) | |
| *F16C 13/02* | (2006.01) | |
| *F16C 23/04* | (2006.01) | |
| *F16C 33/12* | (2006.01) | |
| *F16C 17/22* | (2006.01) | |
| *G03G 15/16* | (2006.01) | |
| *G03G 15/20* | (2006.01) | |
| *G03G 15/00* | (2006.01) | |
| *F16C 33/10* | (2006.01) | |
| *F16C 17/02* | (2006.01) | |

(52) U.S. Cl.
CPC ........... *F16C 23/046* (2013.01); *F16C 33/121* (2013.01); *F16C 33/124* (2013.01); *F16C 33/208* (2013.01); *G03G 21/1647* (2013.01); *F16C 17/02* (2013.01); *F16C 17/022* (2013.01); *F16C 33/102* (2013.01); *F16C 2202/32* (2013.01); *F16C 2204/52* (2013.01); *F16C 2204/60* (2013.01); *F16C 2204/66* (2013.01); *F16C 2204/70* (2013.01); *F16C 2204/72* (2013.01); *F16C 2208/32* (2013.01); *F16C 2208/36* (2013.01); *F16C 2208/40* (2013.01); *F16C 2208/52* (2013.01); *F16C 2208/60* (2013.01); *F16C 2208/66* (2013.01); *F16C 2208/78* (2013.01); *F16C 2220/04* (2013.01); *F16C 2240/54* (2013.01); *F16C 2324/16* (2013.01); *F16C 2370/38* (2013.01); *G03G 15/167* (2013.01); *G03G 15/2053* (2013.01); *G03G 15/757* (2013.01)

(56) References Cited

U.S. PATENT DOCUMENTS

| | | |
|---|---|---|
| 2007/0242910 A1 | 10/2007 | Akita |
| 2009/0016656 A1* | 1/2009 | Blair et al. .................. 384/286 |

FOREIGN PATENT DOCUMENTS

| | | |
|---|---|---|
| JP | 50-155440 U | 6/1974 |
| JP | 59-39316 U | 3/1984 |
| JP | 60-40710 A | 3/1985 |
| JP | 01-172626 A | 7/1989 |
| JP | 02-173417 A | 7/1990 |
| JP | 07-063221 A | 3/1995 |
| JP | 07-233813 A | 9/1995 |
| JP | 07-293565 A | 11/1995 |
| JP | 08-240220 A | 9/1996 |
| JP | 09-032856 A | 2/1997 |
| JP | 10-036875 A | 2/1998 |
| JP | 11-335687 A | 12/1999 |
| JP | 2001-131569 A | 5/2001 |
| JP | 2002-213453 A | 7/2002 |
| JP | 2003-254343 A | 9/2003 |
| JP | 2003-262234 A | 9/2003 |
| JP | 2006-125567 A | 5/2006 |
| JP | 4041206 B2 | 1/2008 |
| JP | 2011-007207 A | 1/2011 |
| JP | 2011-021743 A | 2/2011 |
| JP | 2011-074975 | 4/2011 |
| JP | 2011-074979 A | 4/2011 |
| JP | 2012145187 * | 8/2012 |
| WO | WO2012/117938 * | 9/2012 |

OTHER PUBLICATIONS

Translation of JP2012145187 obtained Mar. 12, 2015.*
Translation of JP09-32856 obtained Jan. 19, 2016.*
International Search Report PCT/JP2012/074035 dated Nov. 27, 2012.

* cited by examiner

SLIDING BEARING AND IMAGE FORMING APPARATUS

TECHNICAL FIELD

The present invention relates to a sliding bearing, and, in particular, to a sliding bearing used to support a roller (heated roller), such as a fuser roller or pressure roller, or shaft of a fuser unit in an image forming apparatus such as a photocopier, multifunction machine, printer (laser printer, inkjet printer, or the like), or fax machine, onto support various types of rollers and shafts in a developer unit, photosensitive unit, transfer unit, paper ejector unit, paper feeder unit, or the like. The present invention also relates to a sliding bearing used in a belt-driving unit for an ink cartridge carriage in an inkjet printer. The present invention also relates to an image forming apparatus using these sliding bearings. The present invention also relates to a sliding bearing for supporting a rotary shaft of a food product machine.

BACKGROUND ART

Generally, an image forming apparatus involves causing toner to adhere to a latent electrostatic image, formed by an optical device, in a fuser device, transferring the toner image to copier paper, and fusing the toner image to the paper. During this fusing process, the toner image passes between a fuser roller having a built-in heater and a pressure roller. A transfer image formed by the toner image is thereby heated, melt-cast, and fused onto the copier paper.

The fuser roller is made of soft metal with a linear or rodlike heater built into a core section thereof, and has a cylindrical shape with small-diameter shaft parts projecting from both ends thereof. The fuser roller is of a metal material having superior thermal conductivity, such as aluminum or an aluminum alloy (A 5056, A 6063). The surface of the fuser roller is finished via turning or grinding. The surface of the fuser roller is also covered with a highly non-adhesive resin, such as a fluororesin. The temperature of the surface of the fuser roller is heated to around 180-250° C. by the heater. The pressure roller is made of iron or a soft material coated with silicone rubber or the like, and presses the copier paper to the fuser roller while being rotatably driven. The pressure roller is heated to roughly 70-150° C. by heat transferred from the heater roller. Alternatively, a heater is provided within the pressure roller as in the case of the fuser roller, and this heater heats the pressure roller to roughly 150-250° C. Hereafter, a roller, like the fuser roller and pressure roller described above, that is heated by a built-in heater or by heat transfer from another member will be referred to as a "heated roller."

The heated roller, which is heated to a high temperature, is rotatably supported at the shaft parts on both ends by deep-groove ball bearings within a housing, and an insulating sleeve of synthetic resin or the like is interposed between the ball bearings and the shaft parts of the heated roller. This arrangement is in order to prevent heat escaping through the ball bearings at both ends when the heated roller is being heated, which can lead to an uneven temperature distribution along the axial direction of the heated roller.

One instance of a supporting bearing for a heated roller utilizes a resin sliding bearing. The sliding bearing is formed, for example, from a synthetic resin such as polyphenylene sulfide (PPS) resin, polyamide (PA) resin, polyamide imide (PAI) resin, polyimide (PI) resin, polyether ether ketone (PEEK) resin, or the like.

If a resin sliding bearing is used, an insulating sleeve is generally not interposed between the resin sliding bearing and the shaft parts of the heated roller, as the resin sliding bearing itself has insulating properties. Normally, a roller bearing or a resin sliding bearing will be used according to the specifications of the fuser unit of the image forming apparatus. Generally, roller bearings are used in mid- or high-grade machines having high pressure/velocity (PV) specs, and resin sliding bearings are used in low-grade devices having comparatively low PV.

However, the deep-groove ball bearings serving as bearings for the heated roller of the fuser device in the image forming apparatus described above are complex in structure and expensive to manufacture. The necessity of the resin insulating sleeve in order to prevent disruptions in temperature distribution uniformity further increases costs. Moreover, bending of the support shaft due to errors in mounting precision in the support shaft of the heated roller or moment loads carries the risk of damaging the bearings.

By contrast, a resin sliding bearing of PPS resin or the like has the advantages that it can be used without the need to interpose an insulating sleeve, is simple in structure, and can be injection molded, allowing for low-cost production. However, such resin sliding bearings have low load capacity compared to ball bearings, and 10 times or more the level of friction torque. As a result, the capacity of the actuating motor must be increased when the bearings are used in an image forming apparatus such as a multifunction machine, printer, or FAX machine, leading to an overall increase in expense. Such bearings are also highly sensitive to the material and surface roughness of the rollers against which they slide. A rough roller sliding surface will increase friction torque and wear levels, and, if the roller is of a soft metal, the resin sliding bearing will cause friction damage in the roller, leading to specifications not being met. In general, a soft metal such as aluminum is used for the material of the heated roller. As surface roughness decreases, machining costs increase. Moreover, there is a limit to the extent to which the surface roughness of a soft metal such as aluminum can be reduced, since they cannot be ground. The low load capacity of a resin sliding bearing also depends upon the material and surface roughness of the counterpart roller.

Even if the sliding surface of the bearing is greased in order to reduce friction torque, there may be insufficient grease on parts subjected to heavy loads, with the result that specifications cannot be met. Moreover, an ordinary resin sliding bearing does not have an aligning function to compensate for moment loads. Thus, moment loads create uneven bearing contact, leading to partial high-pressure surface sections and increasing wear. In addition, the presence of sliding scratches in the contacting surfaces of the roller and the shaft when the bearing is replaced after a fixed period of extended usage means that both the roller and the shaft must be replaced, leading to the problem of increased cost of replacement.

Apart from bearings for heated rollers used in fuser devices, similar problems are present in bearings used in developer units, photosensitive units, paper ejector units, paper feeder units, and the like, which are used at room temperature, and in bearings used in belt-driving units for ink cartridge carriages of inkjet printers and the like.

A sliding bearing comprising an outer ring and an inner ring, in which an annular projection or annular groove formed on an inner circumference of the outer ring and an annular groove or annular projection formed on an outer circumference of the inner ring engage, is known in the art as a bearing intended to address these problems (see patent document 1). Also known is a sliding bearing comprising an outer ring and an inner ring, in which the inner ring is formed from a melt-cast and cured resin composition and a bearing gap between the inner ring and the outer ring is formed by the contraction of the resin when the inner ring cures (see patent document 2).

Also known in the art as a heated roller bearing capable of addressing these problems is a sliding bearing comprising an outer ring and an inner ring, in which one of the outer ring or the inner ring is made of a synthetic resin and the other is made of sintered metal, and the inner circumferential surface of the outer ring and the outer circumferential surface of the inner ring are in sliding contact relative to one another (see patent document 3). Also known as a similar bearing is a sliding bearing constituted by a combination of an inner ring and an outer ring, in which grease is enclosed between the inner ring and the outer ring, and the bearing supports a rotating body that rotates in only one direction, wherein grease-retaining grooves for retaining grease are formed in the outer circumferential surface of the inner ring, the grease-retaining grooves are two rows of pluralities of convergingly disposed pairs of rectangular grooves provided along the entirety of the outer circumferential surface of the inner ring, the more open ends of the pairs being formed so as to face the direction of rotation of the inner ring (see patent document 4).

Food product machines are machines used to mix, blend, heat, dry, chill, fill, wrap, store, or otherwise process raw food materials and finished (or semi-finished) food products. Food product machines, like other types of machinery, are equipped with bearings and other types of sliding parts, and it is necessary to prevent food products from being contaminated by toxic substances leaking from these parts. For this reason, the resins, metals, lubricants, greases, additives, and other materials making up these parts must be carefully selected according to statutory sanitary standards.

Well-known examples of statutory sanitary standards pertaining to materials used in food product applications include regulations for food products and additives (MHLW bulletins) provided for by the Food Sanitation Act and approval standards such as the H-1 designation (a rating for substances that are completely non-toxic to humans even after coming into direct contact with food products) of the U.S. Food and Drug Administration (FDA) and the U.S. Department of Agriculture (USDA). These standards designate materials that can be used in food product machines separate from general industrial materials.

A solid lubricant and a roller bearing for a food product machine in which a solid bearing lubricant is used so that there is no lubricant leakage even if water penetrates into the bearing, and rust does not readily form even if salt solutions or the like penetrates into the bearing, are known in the art as a bearing for food product machines (see patent document 5).

Also known are roller bearings for food product machine in which a solid lubricant for food product machinery that is not washed away by water and can withstand continuous use at high temperatures of 150° C. or more is used, the lubricant being enclosed within the bearings so that the sliding surface does not readily rust even in conditions involving contact with salt solutions (see patent documents 6 and 7). Also known are a bearing in which a pair of slingers are fitted in place onto an immobile shaft onto which a sealed roller bearing is fitted so as to sandwich the roller bearing in the axial direction in order to improve grease leakage resistance (see patent document 8) and a bearing provided with a plurality of seals (see patent document 9).

PRIOR ART DOCUMENT

Patent Document

Patent Document 1: Laid-Open Japanese Utility Model Application S59-039316
Patent Document 2: Laid-Open Japanese Patent Application H09-032856
Patent Document 3: Laid-Open Japanese Patent Application 2011-074975
Patent Document 4: Laid-Open Japanese Patent Application 2011-074979
Patent Document 5: Laid-Open Japanese Patent Application H10-036875
Patent Document 6: Laid-Open Japanese Patent Application H11-335687
Patent Document 7: Laid-Open Japanese Patent Application 2001-131569
Patent Document 8: Laid-Open Japanese Patent Application 2003-262234
Patent Document 9: Laid-Open Japanese Patent Application 2003-254343

SUMMARY OF THE INVENTION

Problems to be Solved by the Invention

However, in the sliding bearings disclosed in patent documents 1 and 2, the inner circumferential surface of the outer ring and the outer circumferential surface of the inner ring are identically shaped, with the result that wear debris forming at the point of engagement between the annular groove and the annular projection is difficult to eject, and tends to accumulate. As a result, not only do increases or variations in friction coefficient arise, but operating clearance is also eliminated, leading to abnormal wearing and seizing. In particular, because the bearing has an annular shape in which the outer ring and the inner ring do not have a joint, there is no mitigating effect yielded by opening and closing of a joint if initial operating clearance is lost due to wear debris accumulation or the like, leading to severe abnormal wear and seizing. In addition, because there is no aligning function, moment loads create uneven bearing contact, leading to partial high-pressure surface sections and increasing wear. In addition, because the bearing clearance between the inner ring and the outer ring of the sliding bearing disclosed in patent document 2 is formed by the contraction of the resin when the inner ring is curing, making it difficult to enclose a lubricant such as grease therein.

In the sliding bearing disclosed in patent document 3, one of the outer ring or the inner ring is formed from sintered metal, the bond between the powder particles is far weaker than in the outer ring or inner ring made of melt-cast metal, creating the risk of the powder being worn off in the form of particles when the ring slides against the resin. When a metal particulate is interposed between an inner and an outer ring that are closed to a certain extent, the metal cannot readily escape from the friction surfaces between the inner and outer rings, leading to abrasion and potentially creating increases in friction torque and wear. If grease is enclosed therein, the metal particles contaminate the grease, making it harder for the metal to escape the friction surfaces between the inner and outer rings and increasing wear. In addition, because sintered metal contains holes, there is a risk of the base oil of the grease being drawn into the holes within the sintered metal, reducing the lubricating power of the grease and increasing friction torque. Even if the holes are pre-impregnated with oil, there is the risk of the oil in the holes escaping to the exterior of the bearing and the base oil of the grease subsequently being drawn into the holes. In addition, the surface precision of the sliding contact surface of the inner or outer ring of sintered metal is less than that of a machined product, especially if the surface has raised and recessed curves, creating lingering concerns in terms of friction torque stability.

In the sliding bearing disclosed in document 4, the grease-retaining grooves in the outer circumferential surface of the inner ring are two rows of pluralities of convergingly disposed rectangular grooves, the more open ends of the pairs being formed so as to face the direction of rotation of the inner ring; thus, there is no effect if there is more than one direction of rotation, limiting the ways in which this bearing can be used. In general, a sliding bearing is provided with a retainer or detent, such as a flange, to keep the outer ring of the bearing from sliding against the housing so as not to come off during use. When sliding bearings with flanges or detents are attached to the two ends of a roller or a shaft, because the bearings are used for rotation in only one direction despite the abovementioned sliding bearings being identically shaped, different bearings must be used for the right and left, which is not economical and leads to concerns of misassembly from a management point of view. In addition, the inner ring and the outer ring both being made of synthetic resin does not address the problem of increased bearing PV.

In the roller bearings for food machinery disclosed in patent documents 5-7, although the solid lubricant is not washed out by water, the bearings are produced by first blending resin and lubricant into a grease which is subsequently enclosed within the bearing, followed by firing. Thus, even in combinations using resins and greases for use in high temperatures as disclosed, the resin is fired at a high temperature, and there is the possibility of the lubricant being degraded during firing. Accordingly, there may be restrictions upon combinations of resins and greases for use in high temperatures in practice, reducing the freedom to select combinations according to the application (patent documents 5-7). In addition, because the amount of enclosed solid lubricant is increased in order to prevent rust to the bearing, the torque of the bearing increases until the lubricant becomes acclimated (patent document 5).

In the bearings disclosed in patent documents 8 and 9, space to provide slingers in the axial direction of the bearing of a plurality of seals is necessary, and the number of parts increases. This makes it difficult to reduce the size, space requirements, and weight of the bearings, and increases manufacturing costs.

Plant-based greases that are safe even if they leak from bearings into food products may be used, but they have shorter lifespans that mineral oil-based or chemically synthesized oil-based grease. Moreover, it is preferable that even plant-based greases not contaminate food products.

As has been seen, there are difficulties in simultaneously and inexpensively solving the problem of grease leakage and reducing space required bearings for food product manufacturing apparatus.

The present invention was contrived in order to address such difficulties. Specifically, an object of the present invention is to provide a sliding bearing that has a simple, easy-to-manufacture structure, does not require an insulating sleeve or the like, is not affected by the material or surface roughness of the roller against which the bearing slides, exhibits low friction torque and low wear, tolerates moment loads, and is easy to replace, as well as an image forming apparatus using the bearing. Another object of the invention is to provide a sliding bearing that can be applied to food product machine applications and is capable of solving the problem of grease leakage while also allowing for reductions in size, weight, space requirements, and torque.

Means for Solving the Problem

A sliding bearing according to the present invention is a radial sliding bearing comprising an inner ring and an outer ring, characterized in that one of the inner ring and the outer ring made of a melt-cast metal have a concavely curved surface along part of the axial direction, and the other comprises an article molded from a resin composition having a convexly curved surface along part of the axial direction and the convexly curved surface contacting and sliding against the concavely curved surface, and the inner ring and the outer ring relatively rotate without contacting each other apart from contacting parts of the convexly curved surface and the concavely curved surface.

The sliding bearing according to the present invention is characterized in that the inner ring and the outer ring are (1) a combination in which the inner ring made of melt-cast metal have the concavely curved surface on the outer circumference and a bearing hole for mating with a support shaft on the inner circumference, and the outer ring comprises an article molded from a resin composition having the convexly curved surface on the inner circumference, or (2) a combination in which the inner ring comprises an article molded from a resin composition, the article having the convexly curved surface on the outer circumference and a bearing hole for mating with a support shaft on the inner circumference, and the outer ring made of melt-cast metal have the concavely curved surface on the inner circumference.

The sliding bearing according to the present invention is characterized in that the article molded from a resin composition is an annular article having a joint in at least one location. The sliding bearing according to the present invention is characterized in that a convex portion constituting the convexly curved surface is not formed within a range of ±10° with respect to the joint.

The sliding bearing according to the present invention is characterized in that the surface roughness of the concavely curved surface is no more than 0.3 μm Ra. The sliding bearing according to the present invention is characterized in that the melt-cast metal is high-carbon chromium bearing steel, chromium-molybdenum steel, machine frame carbon steel, or stainless steel. The sliding bearing according to the present invention is characterized in that the inner ring made of melt-cast metal is an inner ring for a roller bearing, or the outer ring made of melt-cast metal is an outer ring for a roller bearing.

The sliding bearing according to the present invention is characterized in that the base resin of the resin composition is at least one synthetic resin selected from thermoplastic PI resin, polyether ketone (PEK) resin, PEEK resin, polyether ketone etherketone ketone (PEKEKK) resin, PPS resin, PAI resin, PA resin, polyethylene (PE) resin, and polyacetal (POM) resin.

The sliding bearing according to the present invention is characterized in that the resin composition contains polytetrafluoroethylene (PTFE) resin. The sliding bearing according to the present invention is also characterized in that the resin composition contains at least one selected from carbon fibers, aramid fibers, whiskers, mica, graphite, and talc. The sliding bearing according to the present invention is also characterized in that the resin composition contains electroconductive carbon, and the volume resistivity of the article molded from a resin composition is less than $1\times10^6$ Ω·cm.

The sliding bearing according to the present invention is characterized in that when the outer ring comprising an article molded from a resin composition has a joint, the inner diameter of the convex portion constituting the convexly curved surface on the inner circumference of the outer ring is greater than the outer diameter of the concave portion constituting the concavely curved surface on the outer circumference of the inner ring when the joint is in an abutting state.

The sliding bearing according to the present invention is characterized in that the radius of curvature of the concavely curved surface differs from the radius of curvature of the convexly curved surface.

The sliding bearing according to the present invention is characterized in that the convexly curved surface has an uncurved surface portion formed along the entire circumference of the axial-direction center of the convexly curved surface. The sliding bearing according to the present invention is also characterized in that the article molded from a resin composition is an injection-molded article, and an injection molding parting line is formed on the uncurved surface portion.

The sliding bearing according to the present invention is characterized in that a lubricant is disposed between sliding surfaces of the inner ring and the outer ring. The sliding bearing according to the present invention is also characterized in that a lubricant-retaining groove constituted by an axial-direction indentation is formed in at least one location on a load-bearing portion of the article molded from a resin composition.

The sliding bearing according to the present invention is characterized in that the lubricant is at least one grease selected from fluorinated grease, urea grease, and lithium grease. The sliding bearing according to the present invention is also characterized in that the lubricant is an electroconductive grease.

The sliding bearing according to the present invention is characterized in that the outer ring or the inner ring comprises at least one non-sliding surface selected from a recessed detent, a raised detent, and a flange.

The sliding bearing according to the present invention is characterized in that the sliding bearing is used in a fuser unit, transfer unit, developer unit, or paper-conveying roller for feeding or ejecting paper in an image forming apparatus, or in a belt-driving unit for an ink cartridge carriage in an inkjet printer.

The sliding bearing according to the present invention is characterized in that the melt-cast metal is stainless steel, and the sliding bearing is used in a food product machine.

The image forming apparatus according to the present invention is characterized in being provided with the sliding bearing according to the present invention and a roller or shaft supported by the sliding bearing.

Effect of the Invention

As discussed above, the sliding bearing according to the present invention is a radial sliding bearing comprising an inner ring and an outer ring, one of the inner ring and the outer ring made of a melt-cast metal have a concavely curved surface along part of the axial direction, and the other ring comprises an article molded from a resin composition, the article having a convexly curved surface along part of the axial direction that contacts and slides against the concavely curved surface, and the inner ring and the outer ring relatively rotate without contacting each other apart from contacting parts of the convexly curved surface and the concavely curved surface. Because one of the inner ring and the outer ring is made of melt-cast metal, reductions in lubricating power due to wear shedding of metal particulate or base oil being drawn into holes can be prevented. In addition, the concavely curved surface has better surface precision compared to cases in which the ring is made of sintered metal, and friction torque is more stable. Moreover, there is no limit upon the rotational directions of the inner and outer rings, allowing identical sliding bearings to be used at both ends of the roller or shaft.

In addition, the bearing comprises two parts, the inner ring and the outer ring, and thus has fewer parts and a simpler structure than a ball bearing. This allows for easy manufacture, enables reductions in manufacturing steps and assembly time, and allows for low-cost provision. In addition, one of the inner ring or the outer ring being an article molded from a resin composition yields self-insulating properties and the like not found in ball bearings, eliminating the need to provide a separate insulating sleeve or the like. In addition, it is easy to replace the sliding bearing alone, as in the case of a ball bearing.

Because the concavely curved surface and the convexly curved surface contact and slide against each other, the material and surface roughness of the counterpart roller or shaft do not affect friction torque or wear levels, unlike resin sliding bearings that directly slide against the counterpart roller or shaft. In addition, the concavely and convexly curved surfaces of the inner ring and the outer ring contact each other, and the inner ring and outer relatively rotate without contacting each other except at these contacting parts, thereby allowing the contact surface area of the frictional surfaces to be reduced and enabling reductions in friction torque over conventional resin sliding bearings. Moreover, the sliding contact surfaces of the inner ring and the outer ring have complementary concavely and convexly curved surfaces, allowing positional deviation of the inner ring and the outer ring in the axial direction to be prevented, and the rings do not contact each other apart from the contacting parts of the convexly curved surface and the concavely curved surface, allowing moment loads to be tolerated.

By virtue of the aforementioned features, the sliding bearing according to the present invention possesses features striking a halfway point between a ball bearing and a conventional resin sliding bearing in terms of both friction torque and manufacturing costs, and is capable of tolerating moment loads.

Having one of the inner ring or the outer ring be an annular article (article molded from a resin composition) having a joint in at least one location facilitates assembly with the other ring, which is made of melt-cast metal. In addition, the convex portion constituting the convexly curved surface is not formed within a range of ±10° with respect to the joint, promoting stabilized friction torque and improved bearing reliability.

By keeping the surface roughness of the concavely curved surface on the inner ring or outer ring made of melt-cast metal to no more than 0.3 μm Ra, low torque and low wear can be attained. Moreover, having the melt-cast metal be high-carbon chromium bearing steel, chromium-molybdenum steel, machine frame carbon steel, or stainless steel prevents wear damage to the molded article arising from sliding contact with the article molded from a resin composition, and allows stable low torque and low wear to be maintained for extended periods.

The use of an inner ring or an outer ring for use with a roller bearing (ball bearing) as the inner ring or the outer ring means that the concavely curved surface constituting the sliding surface contacting the article molded from a resin composition is a rolling surface of high precision, leading to stabilization of rolling performance. In addition, using an inner ring or an outer ring for a general-purpose roller bearing allows the sliding bearing to be manufactured at low cost.

Having the base resin of the resin composition forming one of the inner ring or the outer ring be at least one type of synthetic resin selected from thermoplastic PI resin, PEK resin, PEEK resin, PEKEKK resin, PPS resin, PAI resin, PA resin, PE resin, and POM resin allows for ease of handling when assembling the ring with its counterpart, and keeps the ring from breaking even if it expands during assembly.

In addition, the inclusion of PTFE resin as a solid lubricant in the resin composition reduces friction torque and creates stability. The application and interposition of a lubricant between the sliding surfaces of the inner ring and the outer ring also contributes to the improvement of low friction torque effects and project stability against the occurrence of localized solid contact or grease dry-out. In addition, including at least one type of reinforcing material selected from carbon fibers, aramid fibers, whiskers, mica, graphite, and talc in the resin composition further increases wear resistance. Moreover, increasing elasticity makes friction torque and wear resistance less subject to the effects of increases in temperature arising from frictional heat generation or the like, allowing for satisfactory use.

Including electroconductive carbon in the resin composition and having the volume resistivity be less than $1 \times 10^6$ $\Omega \cdot cm$ allows the sliding bearing to be used as an electroconductive bearing.

If the outer ring constituted by the article molded from a resin composition has a joint, having the inner diameter of the convex portion constituting the convexly curved surface on the inner circumference of the outer ring be greater than the outer diameter of the concave portion constituting the concavely curved surface on the outer circumference of the inner ring when the joint is in an abutting state keeps the outer ring from clinging to the inner ring during use, ensuring that operating clearance is secured, and also creating an aligning function. Low torque and low wear are thereby guaranteed, yielding a highly reliable bearing.

Because the radius of curvature of the concavely curved surface differs from the radius of curvature of the convexly curved surface, the contact surface area of the inner ring and the outer ring can be reduced, reducing torque.

Forming an uncurved surface portion along the entire circumference of the axial center of the convexly curved surface creates contact with the concavely curved surface at two locations, allowing for the suppression of backlash between the inner and outer rings and stabilizing friction torque.

Having one of the inner ring or the outer ring be an injection-molded article of the resin composition and forming an injection molding parting line on the uncurved surface portion facilitates injection molding and prevents interference with the other sliding contact surface even if burring or flash is present on the parting line.

Applying and interposing lubricant between the sliding surfaces of the inner ring and the outer ring further reduces friction torque as well as wear levels, and allows performance lifespan to be greatly extended. Having the lubricant be at least one grease selected from fluorinated grease, urea grease, and lithium grease in particular yields stable lubricating power and low friction torque. In addition, having the lubricant be an electrically conductive grease allows the sliding bearing to be used as an electroconductive bearing.

Forming a lubricant-retaining groove constituted by an axial-direction indentation on a load-bearing portion of the article molded from a resin composition allows for the stable supply of lubricant to the sliding surfaces.

Providing at least one non-sliding surface selected from a recessed detent, a raised detent, and a flange on the outer ring or the inner ring allows this part to be used as a part for mounting or aligning on a metal base plate, housing, or the like of an image forming apparatus.

The sliding bearing according to the present invention promotes reductions in friction torque, allows moment loads to be tolerated, is less expensive to manufacture than a ball bearing, and does not require an insulating sleeve, allowing the bearing to be advantageously used as a bearing for a fuser unit, transfer unit, developer unit, or paper-conveying roller for feeding or ejecting paper in an image forming apparatus or for a belt-driving unit of an ink cartridge carriage in an inkjet printer.

The image forming apparatus according to the present invention is provided with the sliding bearing according to the present invention and a roller or shaft supported by the sliding bearing, allowing the friction torque of the roller or shaft to be reduced and moment loads to be tolerated. In addition, the sliding bearing is less expensive to manufacture than a ball bearing and does not require an insulating sleeve, allowing the overall cost of manufacturing the apparatus to be reduced.

The sliding bearing according to the present invention comprises two parts, the inner ring and the outer ring, and has no rolling elements such as balls, allowing size, weight, and space requirements to be easily reduced. In addition, the use of stainless steel as the melt-cast metal allows the bearing to be advantageously used as a bearing for supporting a rotary shaft in a food product machine in which the bearing comes into direct or indirect contact with raw food materials or finished (or semi-finished) food products, especially in severe usage conditions, such as in salt solutions or the like. In addition, the need to use grease can be eliminated, in which case there is no risk of the problem of grease leakage. Moreover, the disposition of a predetermined non-toxic lubricant meeting the USDA H-1 designation or FDA standards, as necessary, between the sliding surfaces of the inner ring and the outer ring allows for further reductions in friction torque as well as wear levels, and allows performance lifespan to be greatly extended.

MODE FOR CARRYING OUT THE INVENTION

The sliding bearing according to the present invention is a radial sliding bearing constituted by two members, the outer ring and the inner ring, and subjected to loads in the radial direction. One of the inner ring and the outer ring made of a melt-cast metal have a concavely curved surface along part of the axial direction, and the other ring comprises an article molded from a resin composition having a convexly curved surface along part of the axial direction that contacts and slides against the concavely curved surface, and the inner ring and the outer ring relatively rotate without contacting each other apart from the contacting parts of the convexly curved surface and the concavely curved surface. A convexly curved surface and a concavely curved surface that slide relative to one another are provided along parts of the axial directions of the inner ring and the outer ring, thereby providing non-contacting portions at the two ends of the inner ring and the outer ring further outward in the axial direction than the respective axial direction parts. It is preferably that the parts of the axial directions exclude the axial ends in order to ensure that there are non-contacting parts of the convexly curved surface and the concavely curved surface at both outer ends in the axial direction.

Embodiments of specific combinations of an inner ring and an outer ring include (1) a combination in which the inner ring made of melt-cast metal have the concavely curved surface on the outer circumference and a bearing hole for mating with a support shaft on the inner circumference, and the outer ring comprises an article molded from a resin composition having the convexly curved surface on the inner circumference, or (2) a combination in which the inner ring comprises an article molded from a resin composition having the convexly curved surface on the outer circumference and a bearing hole for mating with a support shaft on the inner circumference, and the outer ring made of melt-cast metal have the concavely curved surface on the inner circumference. Each of these embodiments will be described hereafter.

Figure 1:
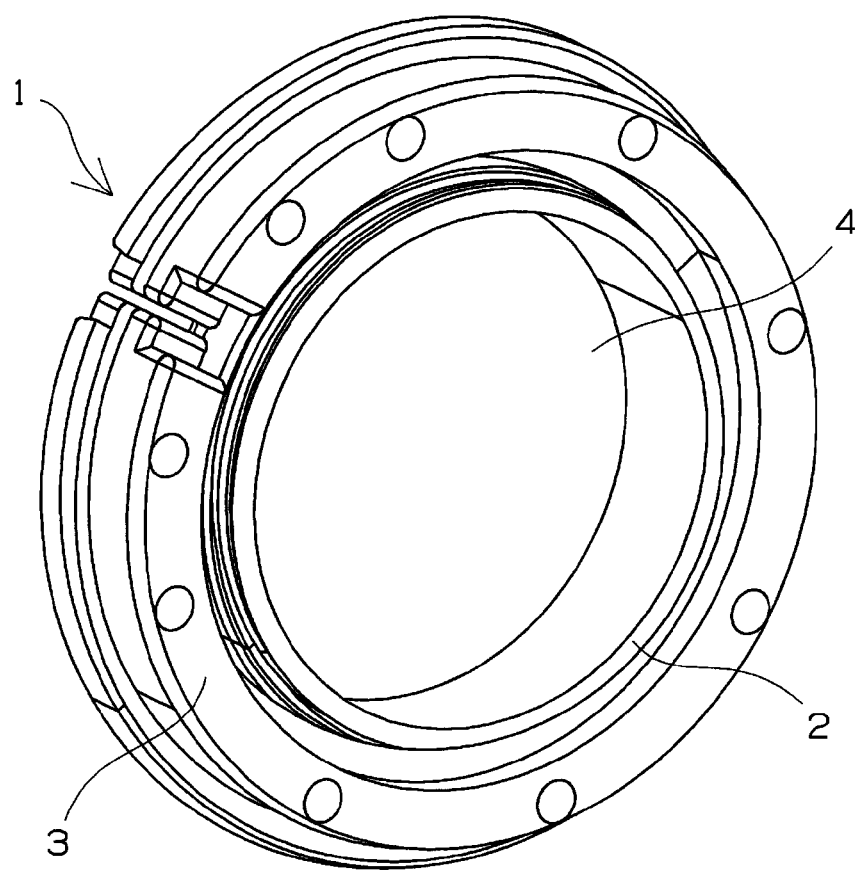
FIG. 1 is a perspective view of an example of a sliding bearing (having an inner ring made of melt-cast metal) according to the present invention.
Figure 2:
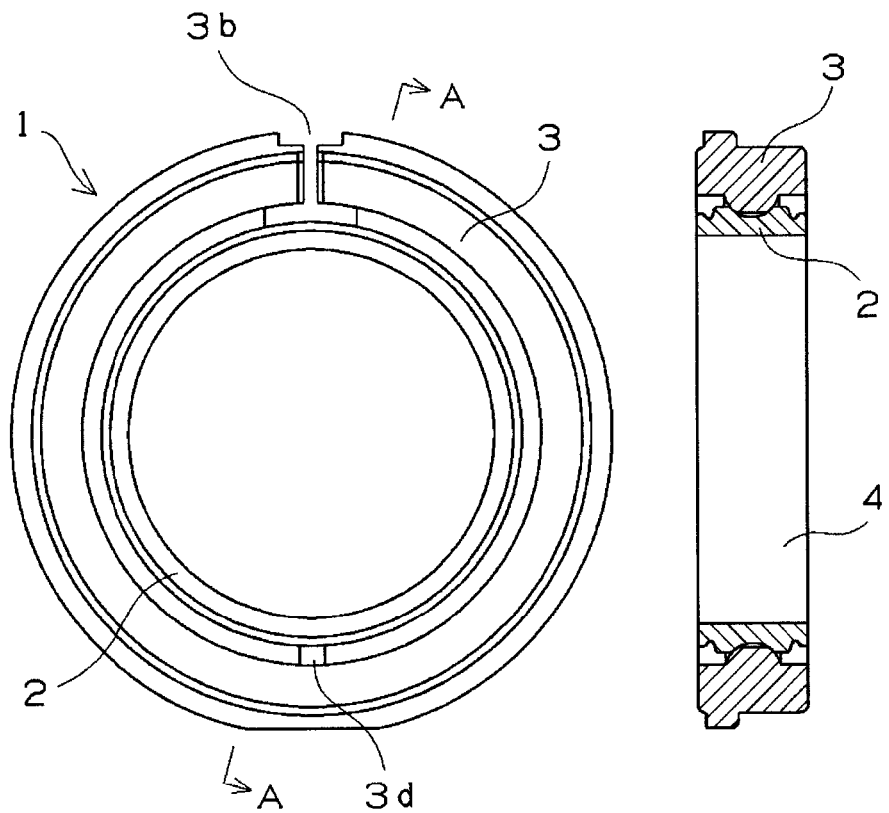
FIG. 2 is a head-on view, axial cross-sectional view, and partially magnified cross-sectional view of the sliding bearing shown in FIG. 1.
Figure 2:
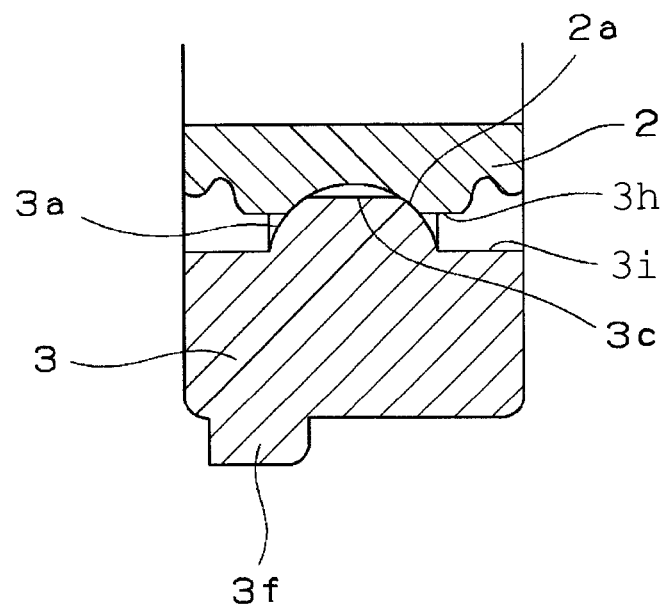

An embodiment of a sliding bearing according to the present invention (in which the inner ring is made of melt-cast metal) will be described with reference to FIGS. 1 and 2. FIG. 1 is a perspective view of a sliding bearing according to the present invention, and FIG. 2 is a head-on view, axial direction cross-sectional view (along line A-A), and partially magnified view of an axial direction cross-sectional view of the sliding bearing. As shown in FIGS. 1 and 2, a sliding bearing 1 is provided with an inner ring 2 of melt-cast metal and an outer ring 3 constituted by an article molded from a resin composition. The sliding bearing 1 is a radial bearing. As shown in FIG. 2, the inner ring 2 comprises a concavely curved surface 2a on the outer circumference, a non-concave surface 3h on the outer circumference and a bearing hole 4 for mating with a support shaft on the inner circumference. The outer ring 3 comprises a convexly curved surface 3a that contacts and slides against the concavely curved surface 2a on the outer circumference of the inner ring 2 and a non-convexly curved surface 3i. The concavely curved surface 2a is provided along part (the central part) of the axial direction of the inner ring 2, and the convexly curved surface 3a along part (the central part) of the axial direction of the outer ring 3. The concavely curved surface 2a on the outer circumference of the inner ring 2 is a concave surface continuously formed in the circumferential direction along the outer circumference of the inner ring 2, and is a concavely curved surface having an arc-shaped (R-shaped) axial cross section. The convexly curved surface 3a on the inner circumference of the outer ring 3 is a convex surface continuously or discontinuously formed in the circumferential direction along the inner circumference of the outer ring 3, and is a convexly curved surface having a roughly arc-shaped (R-shaped, with a partial uncurved surface portion as necessary) axial cross section corresponding to the concavely curved surface 2a of the inner ring 2. "Arc-shaped" encompasses circular, elliptical, and other desired types of curvilinear shapes.

In the sliding bearing 1, the concavely curved surface 2a on the outer circumference of the inner ring 2 and the convexly curved surface 3a on the inner circumference of the outer ring 3 are sliding surfaces. The concavely curved surface 2a and the convexly curved surface 3a slidingly contact, and the inner ring 2 and the outer ring 3 relatively rotate. At least parts of these surfaces are in sliding contact. The inner ring 2 and the outer ring 3 do not contact each other except at the concavely curved surface 2a and the convexly curved surface 3a. The concavely curved surface 2a on the outer circumference of the inner ring 2 and the convexly curved surface 3a on the inner circumference of the outer ring 3 form a slidingly contacting combination, and the two ends outside of the concavely curved surface 2a and the convexly curved surface 3a in the axial direction do not contact, thereby allowing for alignment even if a moment load is generated, enabling such a load to be tolerated. In addition, the convexly curved surface 3a and the concavely curved surface 2a have complementary shapes, allowing positional deviation of the outer ring 3 and the inner ring 2 in the axial direction to be prevented. Moreover, imparting the concavely curved surface 2a of the inner ring 2 with a curved surface as described above allows an inner ring for an existing ball bearing to be used as the inner ring.

The radius of curvature of the concavely curved surface 2a on the outer circumference of the inner ring 2 preferably differs from the radius of curvature of the convexly curved surface 3a on the inner circumference of the outer ring 3. The radii of curvature of the concavely curved surface and the convexly curved surface are the radii of curvature of the arcs of their respective axial cross sections. The radii of curvature of the concavely curved surface and the convexly curved surface (excluding the parts where the convexly curved surface is not present and the parts where the lubricant-retaining groove is present) are constant in the circumferential direction. Imparting the concavely curved surface 2a and the convexly curved surface 3a with identical radii of curvature would increase the contact surface area between the inner ring and the outer ring, leading to the risk of increased friction torque. In addition, if a lubricant such as grease is applied to the sliding surfaces, a surface seal is formed, impeding the supply of lubricant to the frictional surfaces. The relative sizes of the radii of curvature are preferably such that the radius of curvature of the concavely curved surface 2a is greater than the radius of curvature of the convexly curved surface 3a. It is more stable for the convexly curved surface 3a of the outer ring 3, which has the smaller radius of curvature, to fit into the concavely curved surface 2a of the inner ring 2, which has the larger radius of curvature, and this allows moment loads to be more easily borne and alignment more easily performed.

The inner diameter of the convex portion constituting the convexly curved surface 3a on the inner circumference of the outer ring 3 is preferably greater than the outer diameter of the concave portion constituting the concavely curved surface 2a on the outer circumference of the inner ring 2 when a joint 3b in the outer ring 3 is in an abutting state. The inner diameter of the convex portion is the inner diameter of the outer ring at the apical position of the convex portion, and the outer diameter of the concave portion is the outer diameter of the inner ring at the apical position of the concave portion. If there is an uncurved surface portion on the convex portion at the inner diameter of the outer ring, the inner diameter of the outer ring is that of an apical position of an imaginary apical position prior to the provision of the uncurved surface portion. This keeps the outer ring from clinging to the inner ring during use, ensuring that operating clearance is maintained and facilitating alignment. In addition, contact at areas other than load-bearing portions can be avoided, thereby allowing low torque and low wear to be maintained and yielding a highly reliable sliding bearing. In this context, "load-bearing portions" refers to those parts where the inner ring and the outer ring of the bearing contact due to pressing loads placed upon the roller or shaft to which the bearing is attached.

In the present embodiment, the operating clearance D is the inner diameter A of the convex portion on the inner circumference of the outer ring less the outer diameter B of the concave portion on the outer circumference of the inner ring. In other words, D=A-B. The operating clearance D at usage temperature is preferably in a range such that D/B 2/1000 to 25/1000. If D/B is less than 2/1000, the circumferential contact angle of the inner ring and the outer ring will be large, increasing contact surface area and thus friction torque. If D/B exceeds 25/1000, backlash increases. A maximum of 15/1000 is more preferable. Operating clearance at usage temperature is the assumed operating clearance calculated for the inner and outer rings when the whole has reached usage temperature, taking thermal expansion and the like into account.

Figure 3:
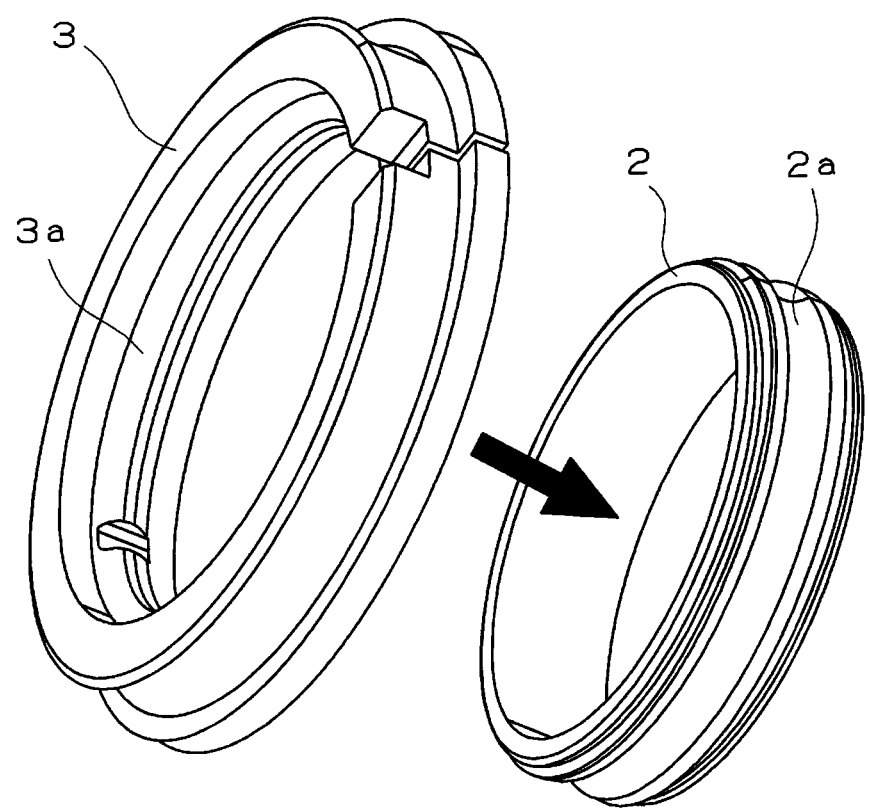
FIG. 3 is an illustration of a process of assembling a sliding bearing according to the present invention.

FIG. 3 shows a process of assembling the sliding bearing 1. The order in which the sliding bearing 1 is assembled is as follows: the outer ring 3 is expanded to at least the maximum outer diameter of the inner ring 2 so that the concavely curved surface 2a on the outer circumference of the inner ring 2 and the convexly curved surface 3a of the outer ring 3 face and contact each other, and fitted onto the concavely curved surface 2a of the inner ring 2 via elastic deformation. If a lubricant such as grease is applied to the sliding surfaces, it is preferably applied before the outer ring 3 is assembled with the inner ring 2. There is no particular limitation upon the position or amount of applied grease or other lubricant, but the lubricant is applied at least to the load-bearing portions, preferably along the entire surface of sliding contact between the inner ring and the outer ring.

Figure 4:
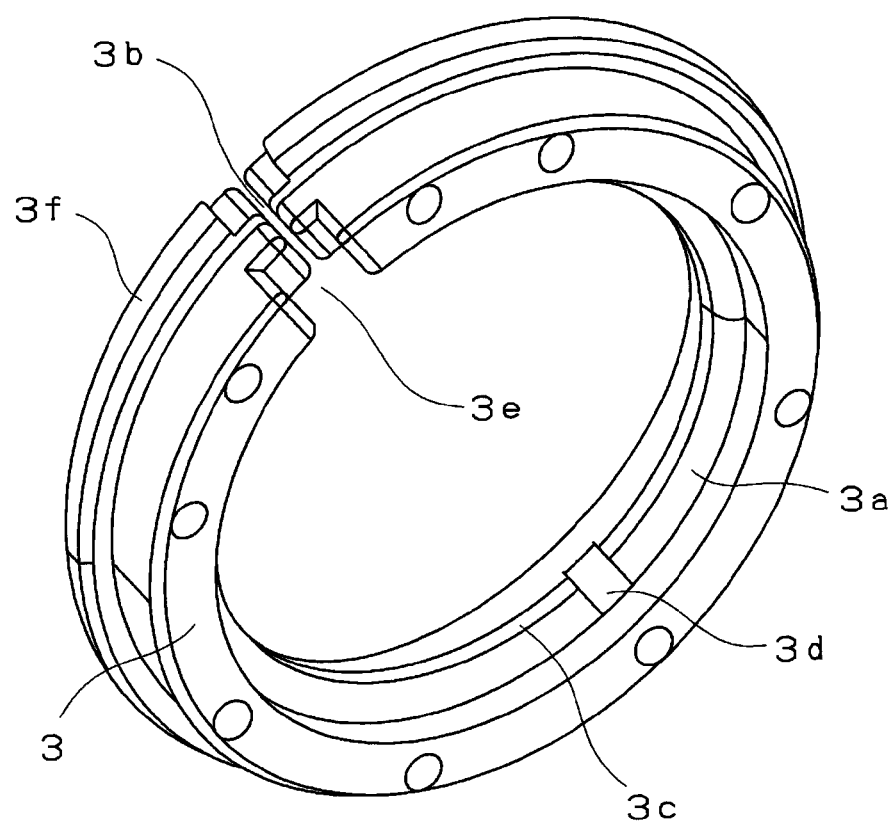
FIG. 4 is a perspective view of only the outer ring of the sliding bearing shown in FIG. 1.
Figure 5:
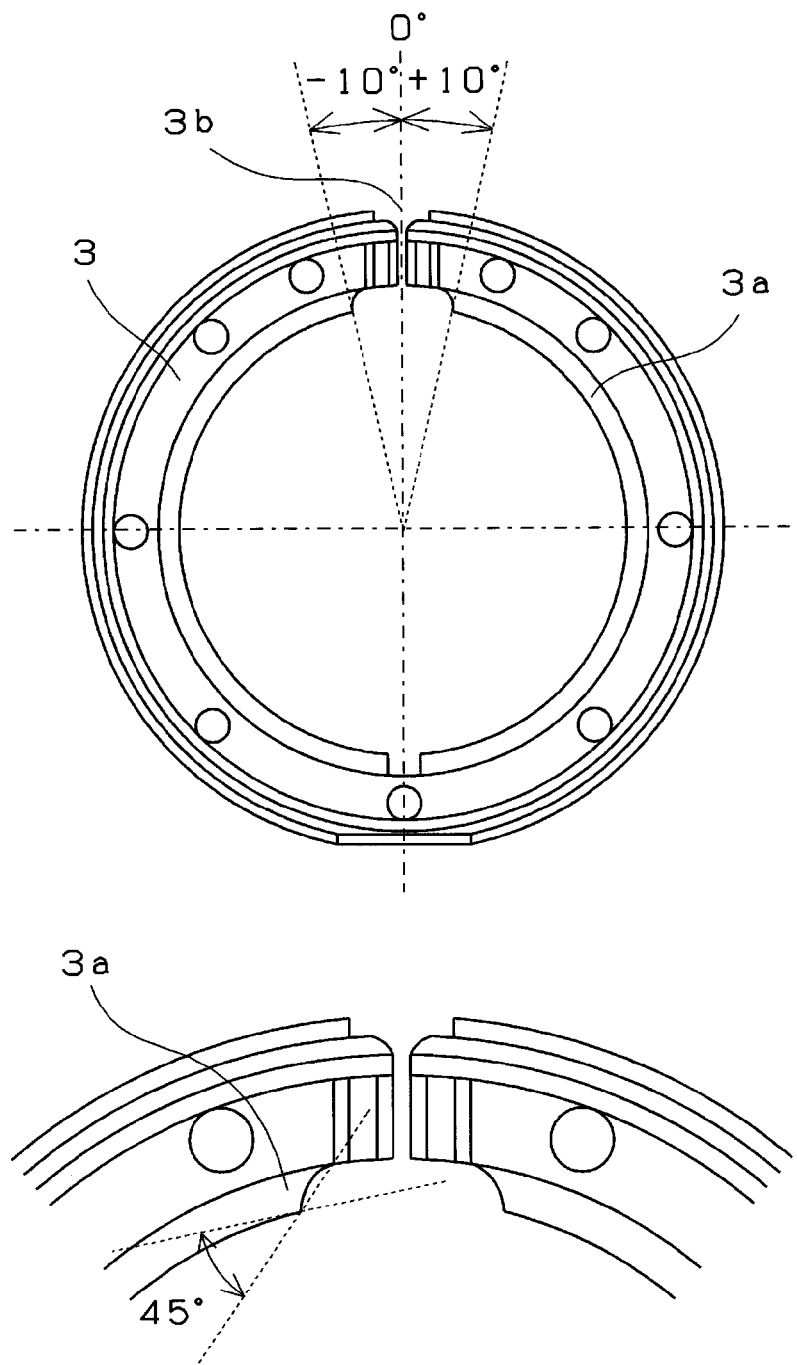
FIG. 5 is a head-on view of only the outer ring and a magnified head-on view of a joint of the sliding bearing shown in FIG. 1.

The outer ring 3 constituted by an article molded from a resin composition will be described with reference to FIGS. 4 and 5. FIG. 4 is a perspective view of only the outer ring of the sliding bearing, and FIG. 5 is a head-on view of the outer ring alone and a magnified head-on view of a joint. The outer ring 3 is an annular article comprising, on the inner circumference, a convexly curved surface 3a that faces and contacts the concavely curved surface on the outer circumference of the inner ring. The "annular article" constituting the outer ring 3 encompasses cases in which there is a separated joint and the ring is not closed at one part, as shown in FIG. 4, etc. Any construction such that the outer ring does not come off the inner ring after being combined with the inner ring is acceptable, and any length is acceptable for the circumferential direction length of the annular article as long as it exceeds 180° of the circumference. However, if grease is applied, a length exceeding 340° is preferable in order to avoid grease leakage or contamination of the grease by foreign matter.

As shown in FIGS. 4 and 5, the outer ring 3 is an annular article having a joint 3b. It is acceptable for there to be a joint 3b in at least one location, or joints may be provided at multiple locations. If the outer ring has joints at multiple locations and comprises multiple conjoined articles, the need to expand the outer ring during the process of assembling it with the inner ring is eliminated, which is useful when the outer ring is formed from a synthetic resin lacking toughness. However, increasing the number of parts in the outer ring increases its price and requires multiple articles to be joined together and fixed in place to prevent the outer ring coming off the inner ring after assembly; thus a single article having a joint at one location, as shown in FIG. 4, etc., is preferable. Having a single joint also facilitates assembly and keeps the outer ring from readily coming off the inner ring after assembly.

It is preferable that the convex portion constituting the convexly curved surface 3a on the inner circumference of the outer ring 3 not be formed within a range of ±10° with respect to the joint 3b, as shown in FIG. 5. In other words, it is preferable that there be no convexly curved surface 3a within this range. There is no particular restriction upon the shape lacking a convexly curved surface as long as there is no convexly curved surface whatsoever, and the inner diameter within this range is greater than the inner diameter elsewhere. In this context, "within a range of ±X° with respect to the joint" signifies a range, taking the position of the joint (if constituted by two separated ends, a position centrally located between the end faces in the circumferential direction) on the circumference of the annular outer ring as 0°, encompassed by a central angle of ±X° from this position. In FIG. 5, the convex portion of the outer ring 3 is not formed in a range of ±10° with respect to the joint 3b.

In the case of an outer ring having multiple joints, the joints constitute seams, and may protrude towards the inner diameter side in sliding contact with the inner ring. In such cases, not only the load-bearing portions but also the joints of the outer ring slidingly contact the inner ring, destabilizing friction torque. In the case of an outer ring having only one joint, the joint may sag inward in the direction of the inner diameter, similarly destabilizing friction torque. Not forming the convex portion constituting the convexly curved surface of the outer ring within a range of ±10° with respect to the joint keeps the joint (i.e., the convex portion on the inner circumference of the outer ring in the vicinity of the joint) from slidingly contacting the inner ring, promoting stabilized friction torque and improved bearing reliability. The maximum extent of the inner ring contacting the outer ring of the sliding bearing is a range of ±45°, substantially roughly 30°, from the load-bearing portion; thus, it is not necessarily essential to form the convexly curved surface outside the range of ±45° from the load-bearing portion.

As shown in FIG. 5, the two ends of the convex portion constituting the convexly curved surface 3a on the inner circumference of the outer ring 3 preferably form an angle of 90° or less with respect to the tangent line of the inner circumference of the outer ring. An angle of 60° or less is more preferable. If the two ends have arc-shaped surfaces, as shown in FIG. 5, a straight line connecting the two arc-shaped ends in cross section preferably forms the above-mentioned angle with respect to the tangent line of the inner circumference of the outer ring. When subjected to a large moment load, the load-bearing portion and the opposite side 180° away both slidingly contact the inner ring. This is because, in such cases, there is the possibility of the inner ring contacting the convex portion on the inner circumference of the outer ring, and the physical edge effect during contact is reduced. If grease is applied, the arrangement described above is capable of preventing grease from being scraped off by the ends of the convex portion of the inner circumference, stabilizing the supply of grease to the frictional surfaces. In FIG. 5, the two ends of the convex portions on the inner circumference of the outer ring form angles of 45° with respect to the tangent line of the inner circumference of the outer ring.

It is preferable that an uncurved surface portion 3c be formed on the convexly curved surface 3a along the entire circumference of the central part of the axial direction of the convexly curved surface 3a of the outer ring 3, as shown in FIG. 4. The uncurved surface portion 3c can be, for instance, a flat-shaped portion having a linear axial cross section. By forming an uncurved surface portion 3c along the entire circumference of the center part of the axial direction, as shown in FIG. 2, it is possible for the concavely curved surface 2a of the inner ring 2 to contact not just one, but two locations on the apex of the convexly curved surface 3a of the outer ring 3 as seen in axial cross section, allowing axial backlash between the inner and outer rings to be suppressed. Friction torque is also stabilized.

If the outer ring 3 is an injection-article molded from a resin composition, an injection molding parting line is preferably formed on the uncurved surface portion 3c. This arrangement facilitates injection molding of the outer ring and prevents interference with the sliding contact surface of the inner ring even if burrs or flash is formed on the parting line, as well as negative effects upon frictional forces.

If a lubricant such as grease or lubricating oil is disposed between the inner and outer rings, the formation of an uncurved surface portion 3c ensures that a hollow part is present between the uncurved surface portion 3c and the concavely curved surface 2a on the outer circumference of the inner ring 2. This part constitutes a lubricant-retaining groove, and also serves to retain the lubricant (see FIG. 2).

If a lubricant such as grease or lubricating oil is disposed between the inner and outer rings, it is preferable to form at least one lubricant-retaining groove constituted by an axial-direction indentation on the load-bearing portion of the outer ring. In this context, an "axial-direction indentation" is a concave portion in the convex portion constituting the convexly curved surface on the inner circumference of the outer ring as seen from the apex of the convex portion, and has a shape penetrating the convex portion in the axial direction. In FIG. 4, a lubricant-retaining groove 3d penetrating the convex portion constituting the convexly curved surface 3a on the inner circumference of the outer ring 3 is formed at a joint-facing portion constituting a load-bearing portion. Lubricant can be retained within the lubricant-retaining groove 3d, enabling stable friction reduction. If the load-bearing portion is at a fixed location, a lubricant-retaining groove 3d is preferably disposed at one location on the load-bearing portion, as shown in FIG. 4. If the load-bearing portion varies or shifts according to the structure of the apparatus, the location at which the bearing is used, or the method by which the bearing is used, it is also possible to provide a lubricant-retaining groove along the entire circumference of the inner diameter, or at multiple locations corresponding to load-bearing portions.

There is no particular limitation upon the depth of the lubricant-retaining groove 3d from the apex of the convex portion on the inner circumference of the outer ring or the circumferential direction width thereof, but a depth of at least 0.5 mm and a circumferential direction width of at least 0.5 mm are preferable in order to obtain grease-retaining effects. However, if the circumferential direction width is too great, the possibility of backlash contact with the bottom of the groove arises; thus, the circumferential direction wide is preferably no more than 10% of the inner diameter of the outer ring. The inner diameter of the outer ring is the inner diameter of the convex portion constituting the convexly curved surface on the inner circumference of the outer ring.

It is preferable to provide at least one non-sliding surface selected from a recessed detent, a raised detent, and a flange on the outer ring for the sake of alignment within or mounting to a device such as a fuser device. In FIG. 4, a recessed detent 3e and a flange 3f are provided. The recessed detent 3e mates with a convex portion (not shown) formed on a housing or the like. Providing a detent or the like allows the part to be used as a part for mounting or aligning on a metal base plate, housing, or the like of an image forming apparatus. As a result, rotation of the sliding bearing with respect to the fuser device during use can be prevented, suppressing the occurrence of problems such as the joint becoming a load-bearing portion or the lubricant-retaining groove shifting from the load-bearing portion.

The outer ring 3 is an article molded from a resin composition. There is no particular limitation upon the type of synthetic resin constituting the base resin of the resin composition, but it must at least exhibit characteristics and assembly properties (heat resistance, mechanical strength, etc.) suited to the conditions in which the sliding bearing is used. An injection-moldable synthetic resin is preferable, as this will facilitate manufacturing and allow costs to be reduced.

Examples of the base resin (synthetic resin) of the resin composition forming the outer ring are thermoset PI resin, thermoplastic PI resin, PEKEKK resin, PEK resin, PEEK resin, wholly aromatic polyester resin, polytetrafluoroethylene-perfluoroalkyl vinyl ether copolymer (PFA) resin, tetrafluoroethylene-hexafluoropropylene copolymer (FEP) resin, ethylene-tetrafluoroethylene copolymer (ETFE) resin, polyethylene terephthalate resin (PET), polybutylene terephthalate resin (PBT), PPS resin, PAI resin, PA resin, PE resin, POM resin, and phenolic resin. These resins may be used singly in polymer alloys comprising a mixture of two or more types.

In order to yield a sliding bearing that is low in cost and easily manufactured, does not require an insulating sleeve or the like, is low in friction torque, and has low wear properties, it is preferable to use a thermoplastic resin that is capable of being injection molded and recycled as the synthetic resin. Of these, a crystalline resin is especially preferable due to its superior friction and wear properties. Examples of such crystalline thermoplastic resins include thermoplastic PI resin, PEKEKK resin, PEK resin, PEEK resin, PPS resin, PAI resin, PA resin, PE resin, and POM resin. These resins are tough, and thus will not break even if there is one joint and the ring expands when being assembled with the inner ring. In addition, these resins will not be contaminated even if a lubricant such as grease is applied, eliminating the risk of solvent cracks.

A resin that suits the location and conditions (heat resistance, mechanical strength, etc.) under which the sliding bearing is used and allows for the most inexpensive manufacturing may be selected from these thermoplastic resins. For example, heat resistance of 150° C. or greater is necessary for a sliding bearing for supporting a heated roller, such as a fuser roller or pressure roller, of a fuser unit in an image forming apparatus. In such conditions, it is preferable to use thermoplastic PI resin, PEKEKK resin, PEK resin, PEEK resin, PPS resin, or PAI resin, which exhibit superior creep resistance, load resistance, wear resistance, and the like. More specifically, in temperature conditions of 150-230° C., PPS resin, which has a continuous usage temperature of 230° C., is heat resistant, and is most inexpensive, is most preferable; and in high temperature conditions of 230° C.-250° C., thermoplastic PI resin having a continuous usage temperature of 240° C. or PEKEKK resin, PEK resin, or PEEK resin having a continuous usage temperature of 250° C. or greater is preferable.

For a sliding bearing used to support a shaft of a transfer belt guide or the like in an transfer unit, a shaft of a cartridge or the like in a developer unit, a paper-conveying roller or shaft for feeding or ejecting paper, or a shaft of a belt-driving unit for an ink cartridge carriage in an inkjet printer, inexpensive PA resin, PE resin, or POM resin may be selected, as the bearing is used at room temperature. More preferable is POM resin, which exhibits little molding contraction or change in water absorption dimensions and high dimensional precision and stability, or low water-absorbent modified PA resin.

An example of a commercially available thermoplastic PI resin that can be used in the present invention is AURUM®; Mitsui Chemicals, Inc., which has a melting point of around 388° C. and a glass transition point of 250° C. Because PI resin does not crystallize within the mold during injection molding, a crystallizing treatment (thermal treatment) is preferably performed after molding. However, this crystallizing treatment is not essential if it is not problematic in terms of bearing usage conditions (heat resistance, grease resistance, etc.) if the resin in non-crystalline. However, a crystallizing treatment is essential if temperature conditions exceed the mold temperature (about 200° C.).

A PEEK resin is a crystalline thermoplastic resin having the polymer structure shown in formula (1) below, in which a benzene ring is linked to a carbonyl group by an ether bond at a para site. A PEEK resin having the structure shown in formula (1) has a melting point of about 343° C., a glass transition point of 143° C., and superior heat resistance, creep resistance, load resistance, wear resistance, and sliding properties, as well as superior moldability. Examples of commercially available PEEK resins that can be used in the present invention include PEEK resins (90P, 150P, 380P, 450P, etc.) produced by Victrex plc., KetaSpire® (KT-820P, KT-880P, etc.) produced by Solvay Advanced Polymers K.K., and VESTAKEEP® (1000G, 2000G, 3000G, 4000G, etc.) produced by Daicel-Degussa Ltd.

[Formula 1]

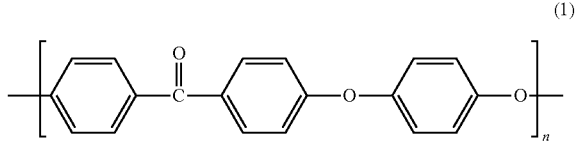

PEKEKK resin and PEK resin are more heat resistant resins that PEEK resin. The melting point of PEKEKK resin is about 387° C., and the glass transition point is 162° C. The melting point of PEK resin is about 373° C., and the glass transition point is 152° C. An example of a commercially available PEKEKK resin usable in the present invention is ST-G45, produced by Victrex plc, and an example of a commercially available PEK resin is HT-G22, produced by Victrex plc.

A PPS resin is a crystalline thermoplastic resin having the polymer structure shown in formula (2) below, in which a benzene ring is linked by a sulfur bond at a para site. A PPS resin having the structure shown in formula (2) has a melting point of about 280° C., a glass transition point of 90° C., and extremely high rigidity and superior heat resistance, dimensional stability, wear resistance, and sliding properties. There are various types of PPS resins according to their molecular structure, such as crosslinked, semi-crosslinked, straight-chain, and branch-chained; in the present invention, these can be used without any limitation upon molecular structure or molecular weight. However, if the outer ring is expanded when being assembled with the inner ring, it is preferable to use a semi-crosslinked resin having a comparatively high level of toughness or a branch-chained resin having the highest level of toughness. Examples of commercially available PPS resins that can be used in the present invention include #160 produced by Tosoh Corporation and T4AG or LR2G produced by DIC.

[Formula 2]

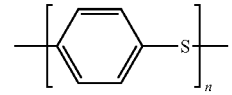

Examples of PA resins that can be used in the present invention include PA6 resins (AMILAN® produced by Toray, Ultramid B produced by BASF, etc.), PA66 resins (AMILAN® produced by Toray Industries, Inc, Ultramid A produced by BASF, etc.), PA46 resins (Stanyl produced by DSM), PA12 resins (DAIAMID® produced by Daicel-Degussa Ltd, etc.), PA610 resins (AMILAN® produced by Toray), PA612 resins (Zytel® PA612 produced by DuPont, Polyamide 612 produced by Daicel-Degussa Ltd, etc.), modified PA6T resins (ARLEN™ produced by Mitsui Chemicals, Inc., Ultramid T produced by BASF, etc.), and modified PA9T resins (Genestar™ produced by Kuraray Co., Ltd.). These PA resins may be used singly in polymer alloys comprising a mixture of two or more types. Because PA resin has a high rate of water absorption and easily undergoes changes in dimensions, modified PA6T resin or modified PA9T resin, which, of the abovementioned resins, have the lowest water absorption rates, is preferable.

PE resins of a wide variety of molecular weights, from low molecular weight to ultra-high molecular weight, are commercially available. However, ultra-high molecular weight PE cannot be injection molded. The higher the molecular weight of the PE resin, the high its physical properties and wear resistance; thus, high-molecular-weight PE capable of being injection molded is preferable. Examples of commercial PE resins that can be used in the present invention are LUBMER™ L5000 and L4000, produced by Mitsui Chemicals, Inc.

Three types of POM resins that can be used in the present invention are homopolymers (Tenac™ produced by Asahi Kasei Corporation, Durulene produced by DuPont), copolymers (Tenac™ C produced by Asahi Kasei Corporation, DURACON® produced by Polyplastics Co., Ltd. etc.), and block copolymers (Tenac™ produced by Asahi Kasei Corporation), but the present invention is not particular limited to these.

PEKEKK resin, PEK resin, PEEK resin, PPS resin, PAI resin, PA resin, PE resin, and POM resin crystallize within the mold during injection molding. Thus, there is no need to perform a crystallizing treatment (thermal treatment). However, if the temperature at which the bearing is used is equal to or higher than the injection molding mold temperature, the bearing will undergo dimensional changes due to mitigation of molding stress, thus necessitating an annealing treatment (thermal treatment) at a temperature equal to or higher than the temperature at which the bearing is used.

In order to stabilize the friction torque of the sliding bearing at a low level, it is preferable to include a solid lubricant in the resin composition forming the outer ring. PTFE resin is especially preferably included as a solid lubricant.

The proportion of solid lubricant in the composition is preferably 3-40 volume % of the total amount of resin composition, more preferably from 10-30 volume %. If the lubricant content is less than 3 volume %, friction reduction will be insufficient, and, if it exceeds 40 volume %, there is a risk of reductions in wear resistance.

The PTFE resin used in the present invention may be any of a molding powder obtained via suspension polymerization, fine powder obtained via emulsion polymerization, or recycled PTFE. In order to stabilize the fluidity of the resin composition, it is preferable to use recycled PTFE that resists forming fibers due to shearing during molding and increases in melt viscosity. The recycled PTFE is a thermally treated (i.e., having a thermal history of firing or the like) powder or a powder that has been irradiated with gamma radiation or an electron beam. Because the recycled PTFE has been thermally treated once before, it is not subject to transformations such as fiber formation due to friction shearing. Thus, friction torque is stable, and wear resistance is improved. Examples include thermally treated molding powders or fine powders, similar powders that have been further irradiated with gamma radiation or an electron beam, powders formed by pulverizing a molding powder or fine powder compact, similar powders that have been subsequently irradiated with gamma radiation or an electron beam, and gamma radiation- or electron beam-irradiated molding powders or fine powders.

Examples of commercially available PTFE resins capable of being used in the present invention include: KTL-610, KTL-350, KTL-8N, and KTL-400H, all produced by Kitamura Limited; Teflon® 7-J, produced by Mitsui DuPont Fluorochemicals Co., Ltd.; Fluon® G163, L169J, L170J, and L173J, all produced by Asahi Glass Co., Ltd.; Polyflon™ M-15 and Lubron™ L-5 produced by Daikin Industries, Ltd; and Hostaflon™ TF 9205 and TF 9207 produced by Hoechst AG. Also acceptable is PTFE modified by a perfluoroalkyl ether group, a fluoroalkyl group, or a sidechain group comprising another fluoroalkyl.

In order to increase the wear resistance of the outer ring of the sliding bearing, a fibrous, flaked, or sheet-shaped reinforcing material is preferably included in the resin composition forming the outer ring. This is especially useful in the case of a heated roller bearing used at high temperatures of 150° C. or higher as it promotes increased strength and elasticity at high temperatures. Examples of reinforcing materials include glass fibers, carbon fibers, aramid fibers, whiskers, slag wool, mica, talc, graphite, glass flakes, molybdenum disulfide, tungsten disulfide, and boron nitride.

The proportion of reinforcing material in the composition is preferably 1-20 volume % of the total amount of resin composition, more preferably from 5-10 volume %. If the reinforcing material content is less than 1 volume %, there will be insufficient improvement in wear resistance, and if it exceeds 20 volume %, friction properties will be inhibited, leading to the risk of wear damage to the inner ring constituting the counterpart sliding member. In addition, rigidity will be high, potentially leading to breakage when the outer ring is expanded and fitted onto the inner ring.

Of the abovementioned reinforcing materials, at least one selected from carbon fibers, aramid fibers, whiskers, mica, talc, and graphite is preferably included. Using these materials allows for wear to the inner ring constituting the counterpart sliding member to be suppressed while maintaining reinforcing effects. The wear resistance and high-temperature strength and elastic modulus retention of the outer ring constituted by a resin molded article can also be further improved. Among the abovementioned reinforcing materials, lubricative flaked graphite is ideal as a reinforcing material capable of suppressing wear to the inner ring constituting the counterpart sliding member while maintaining reinforcing effects. In order to increase the adhesion of a fibrous reinforcing material and the synthetic resin and improve reinforcing effects, the surface of the reinforcing material may be treated using an agent containing epoxy resin, polyamide resin, polycarbonate resin, polyacetal resin, or the like, or a silane coupling agent (silane treatment).

The carbon fibers used in the present invention may be either pitch-based or PAN-based as classified according to their raw material, but PAN-based carbon fibers having a high elastic modulus are preferable. There is no particular limitation upon the firing temperature, but a carbide product fired at a temperature of roughly 1000-1500° C. is preferable to a graphitized product fired at a high temperature of 2000° C. or higher, as the inner ring in sliding contact will be less subject to wear damage. The carbon fibers have an average fiber diameter of 20 µm or less, preferably 5-15 µm or less. Carbon fibers thicker than the abovementioned range are not preferable as they will generate extreme pressure, increasing wear damage to the inner ring.

Examples of commercially available pitch-based carbon fibers that can be used in the present invention include Kureka Milled (M101S, M101F, M101T, M107S, M1007S, M201S, and M207S) produced by Kureha Corporation, and Donacarbo Milled (S241, S244, SG241, and SG244) produced by Osaka Gas Chemicals Co., Ltd., and examples of PAN-based fibers include Tenax® HTA-CMF0160-0H and CMF0040-0H produced by Toho Tenax Co., Ltd.

The aramid fibers used in the present invention may be either para- or meta-aramid fibers as classified according to their molecular structure. Because aramid fibers are organic, they are soft and will not readily cause wear damage to the inner ring in sliding contact. Examples of commercially available para-aramid fibers include Twaron and Technora produced by Teijin Limited. and Kevlar produced by DuPont, and an example of commercially available meta-aramid fibers is Conex produced by Teijin Limited.

Examples of the whiskers used in the present invention include potassium titanate whiskers (Otsuka Chemicals Co., Ltd.), titanium oxide whiskers (Ishihara Sangyo KAISHA, Ltd.), zinc oxide whiskers (Panasonic Corporation), aluminum borate whiskers (Shikoku Chemicals Corporation), calcium carbonate whiskers (Maruo Calcium Co., Ltd.), and wollastonite. There is no particular restriction upon Mohs hardness, but a low hardness is preferable; for example, potassium titanate whiskers (Otsuka Chemicals Co., Ltd.), calcium carbonate whiskers (Maruo Calcium Co., Ltd.), or wollastonite having a Mohs hardness of 4 or less is preferable.

Out of flaked or sheet-form reinforcing materials, it is preferable to include at least one selected from mica, graphite, and talc. These may be added in addition to carbon fibers, aramid fibers, or whiskers. Using these materials imparts wear resistance due to the reinforcing effects and allows wear to the inner ring constituting the counterpart sliding member to be suppressed without inhibiting friction performance. Graphite is especially preferable as it is also effective as a solid lubricant.

If the sliding bearing must be electroconductive, as in cases in which a fuser roller is grounded via the sliding bearing, it is preferable to include electroconductive carbon in the resin composition forming the outer ring in order to impart the outer ring, which is a resin part, with electroconductive properties. The amount thereof included is preferably adjusted so that the volume resistivity of the outer ring is less than $1 \times 10^6$ $\Omega \cdot cm$.

Types of electroconductive carbon include carbon nanotubes, fullerenes, carbon powder, and spherical graphite, any of which can be used. Of these, carbon powder is preferable as it does not exhibit shape anisotropy and yields superior cost performance. One type of carbon powder is carbon black. Carbon black produced using either a degradation method, such as thermal black oringtylene black, or an incomplete combustion method, such as channel black, gas furnace black, oil furnace black, pine soot, or lamp black, can be used. From considerations of electroconductivity, furnace black, acetylene black, or Ketjenblack® is preferably used, with Ketjenblack being more preferable due to its superior electroconductivity.

The Ketjenblack preferably has a primary particle diameter of 30-38 nm. This primary particle diameter range allows a sufficient volume resistivity value to be obtained with only a small amount of Ketjenblack. The BET specific surface area of the Ketjenblack is preferably 1000-1500 $m^2/g$. This specific surface area extent allows for superior volume resistivity stability with only a small amount of Ketjenblack. An example of such Ketjenblack is Ketjenblack EC-600 JD produced by Lion Corporation (primary particle diameter: 34 nm; BET specific surface area: 1270 $m^2/g$).

A known resin additive may also be added to the resin composition to the extent that the effects of the present invention are not inhibited. For example, a friction property improver such as boron nitride, molybdenum disulfide, or tungsten disulfide, a colorant such as powdered carbon, iron oxide, or titanium oxide, or a thermal conductivity improver such as graphite or powdered metallic oxide can be added.

There is no particular limitation upon the means used to mix and blend the various raw materials described above; the feedstock powders can be dry-mixed in a Henschel mixer, ball mixer, ribbon blender, Lodige mixer, or ultra-Henschel mixer, then melt-blended in a melt extruder such as a twin-screw extruder to obtain pellets (granules) for molding. A filler may be introduced using a side feed when performing melt-blending in a twin-screw extruder. The molding method is preferably injection molding from considerations of manufacturing efficiency. The molded product may optionally be annealed or otherwise treated.

Figure 6:
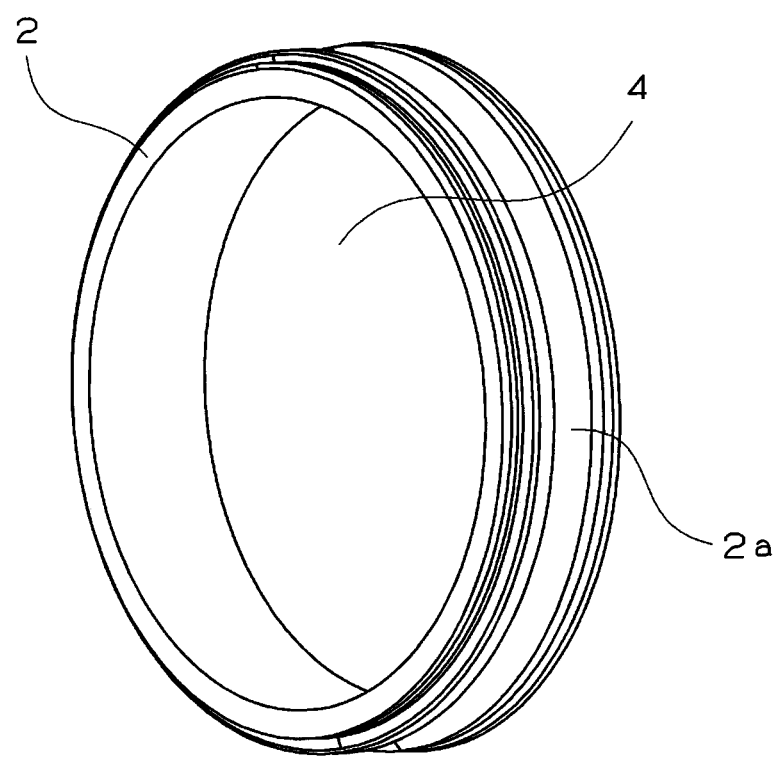
FIG. 6 is a perspective view of only the inner ring of the sliding bearing shown in FIG. 1.

An inner ring 2 of melt-cast metal will be described with reference to FIG. 6. FIG. 6 is a perspective view of only the outer ring of a sliding bearing. As shown in FIG. 6, the concavely curved surface 2a on the outer circumference of the inner ring 2 has an arc-shaped (R-shaped) axial cross section. The concavely curved surface 2a constitutes a sliding surface with the outer ring. This shape allows for mitigation of moment loads placed thereupon, and enables reduced torque and wear thanks to stable bearing of pressure.

An inner ring for use in an existing roller bearing, such as a ball bearing, can be repurposed for use as the inner ring 2. In such cases, the concavely curved surface 2a on the outer circumference constituting the sliding surface with the outer ring is an inner ring rolling surface of a roller bearing and exhibits high precision, leading to stabilized rotation performance. There is also no need to manufacture a separate inner ring for use with the sliding bearing according to the present invention, leading to reduced manufacturing costs.

Because the inner ring 2 is made of melt-cast metal, reductions in lubricating power due to wear shedding of metal particulate or base oil being drawn into holes, as in the case of sintered metal, can be prevented. There is no particular limitation upon the material used for the inner ring 2 so long as it is a melt-cast metal. Examples include high-carbon chromium bearing steel, chromium-molybdenum steel, machine frame carbon steel, stainless steel, cast iron, aluminum alloy, and brass. As high a level of degree of hardness as possible is preferable, as this will decrease wear damage caused by sliding contact with the outer ring. Examples of such high-hardness melt-cast metals include high-carbon chromium bearing steel, chromium-molybdenum steel, and machine frame carbon steel. If the bearing is to be used in environments requiring corrosion resistance, such as in high-humidity atmospheres or in a liquid, stainless steel (martensitic or austenitic) is preferable. In order to reduce wear damage due to sliding contact, the metal is preferably subjected to a treatment such as tempering in order to increase surface hardness. If it is not problematic in terms of functioning, a surface treatment such as nickel plating or chromium plating can be performed in order to prevent rust.

A material used for an inner ring of an ordinary roller bearing (such as high-carbon chromium bearing steel) is especially preferably, as it can be inexpensively obtained. In addition, although ordinary roller bearings are tempered, this is not necessary if it is not problematic in terms of functioning.

The surface roughness of the concavely curved surface (sliding contact surface) on the outer circumference of the inner ring 2 is preferably no more than 0.3 μm Ra. This is because, as surface roughness decreases, the level of wear caused by microscopic ridges formed during machining digging into the resin outer ring decreases, extending lifespan. In addition, as surface roughness decreases, torque decreases. Methods of machining surface roughness include turning, grinding, and super-finishing, but the present invention is not particularly limited to these. A surface roughness of no more than 0.1 μm Ra is more preferable. The inner ring of an ordinary roller bearing is super-finished to a surface roughness of no more than 0.03 μm Ra, allowing for further reductions in wear and torque.

A lubricant such as lubricating oil or grease is preferably applied to the sliding surfaces of the inner ring and the outer ring (i.e., the surfaces of the inner ring and the outer ring that slide). Applying and interposing lubricant between the sliding surfaces allows friction torque as well as wear levels to be further reduced, and performance lifespan to be greatly extended. There is no particular limitation upon the lubricant as long as it is capable of reducing torque; ordinarily, a grease, lubricating oil, or the like used in sliding bearings can be used.

Examples of base oils if a grease is used include mineral oils such as paraffin-based mineral oil and naphthenic mineral oil; hydrocarbon-based synthetic oils such as polybutene oil, poly-alpha-olefin oil, alkylbenzene oil, alkylnaphthalene oil, and cycloaliphatic compounds; natural oil; and non-hydrocarbon-based synthetic oils such as polyolester oil, phosphate ester oil, diester oil, polyglycol oil, silicone oil, polyphenyl ether oil, alkyldiphenyl ether oil, and fluorinated oil. These base oils may be used singly or in combinations or two or more.

Examples of thickeners used as grease constituents include thickeners based on metal soaps such as aluminum soap, lithium soap, sodium soap, complex lithium soap, complex calcium soap, and complex aluminum soap; urea-based compounds such as diurea compounds or polyurea compounds; and powdered fluororesins such as PTFE resin. These thickeners may be used singly or in combinations or two or more. Known additives may optionally be included in the various greases described above as necessary.

Fluorinated greases, urea greases, and lithium greases generally used in roller bearings are preferable, as they exhibit superior lubrication and have commercial track records. Examples of commercially available fluorinated greases that can be used in the present invention include Barrierta and Noxlub produced by NOK Kluber, and Demnum™ produced by Daikin Industries, Ltd. Examples of commercially available urea greases include Excelite produced by Kyodo Yushi Co., Ltd. and Amblygon and Petamo produced by NOK Klüber. Examples of commercially available lithium greases include Alvania S grease produced by Showa Shell Sekiyu K.K. and Multemp SRL produced by Kyodo Yushi Co., Ltd. There is no particular limitation upon the viscosity of the base oil or the thickness of the grease, and these may be selected according to the conditions in which the sliding bearing is used.

A grease that suits the location and conditions (heat resistance, mechanical strength, etc.) under which the sliding bearing is used and allows for the most inexpensive manufacturing may be selected from these greases. For example, heat resistance of 150° C. or greater is necessary for a sliding bearing for supporting a heated roller, such as a fuser roller or pressure roller, of a fuser unit in an image forming apparatus. In such conditions, the use of a highly heat-resistant fluorinated grease or urea grease is preferable. Taking heat accumulation with the image forming apparatus into account, a sliding bearing used to support a shaft for a transfer belt guide in a transfer unit, a shaft for a cartridge in a developer unit, a paper-conveying roller or shaft for feeding or ejecting paper, or a shaft of a belt-driving unit for an ink cartridge carriage in an inkjet printer is used in temperatures of 100° C. or less; thus, an all-purpose, inexpensive lithium grease may be selected.

If it is necessary for the sliding bearing to be electroconductive, electroconductivity is imparted to the outer ring constituting the resin part and to the lubricant present between the inner and outer rings. There is no particular limitation upon the additive used to impart the grease with electroconductivity; examples include graphite and electroconductive carbon. However, because graphite has a comparatively large average particle diameter of a few microns to a few dozen microns, it may enter into the sliding surfaces along with the grease, creating an abrasively wearing state, and negatively affected sliding properties. Thus, the above-mentioned electroconductive carbon, which comprises microparticles, is preferable as it exhibits little effect upon sliding properties. Generally, it is more preferable to use an electroconductive grease used with roller bearings. Examples of electroconductive fluorinated greases include Barrierta BFX3 (electroconductive carbon formulation) produced by NOK Klüber and Hi-Lube FG-1222 and 1223 produced by Harves Co., Ltd.

Examples of lubricating oils are oils of the same type as the abovementioned grease base oils. Because a lubricating oil may escape from between the inner ring and the outer ring, a grease, which is not readily extruded outside the bearing, is preferable.

The grease base oil or lubricating oil preferably has a dynamic viscosity at usage temperature of 3-100 mm$^2$/s. A dynamic viscosity of less than 3 mm$^2$/s makes it difficult to form a lubricant film, increasing friction torque. A dynamic viscosity of 100 mm$^2$/s will lead to increased friction torque due to viscous resistance. A dynamic viscosity of 3-50 mm$^2$/s is more preferable.

Lubrication state is related to operating clearance and the dynamic viscosity of the grease base oil or lubricating oil. Thus, the product (unit: mm$^2$/s) of [operating clearance (mm)/the outer diameter (mm) of the concave portion of the outer circumference of the inner ring] at usage temperature and [grease base oil or lubricating oil dynamic viscosity (mm$^2$/s)] at usage temperature is preferably 0.01-2. If the product is less than 0.01, the contact surface area of the inner and outer rings will increase and lubricant film formation will be poor, increasing friction torque. If the product exceeds 2, friction torque will be increased due to the viscous resistance of the oil. A product of 0.02-1 is more preferable.

The image forming apparatus according to the present invention is provided with the sliding bearing according to the present invention and a roller or shaft supported by the sliding bearing, allowing the friction torque of the roller or shaft to be reduced and moment loads to be tolerated. In addition, the sliding bearing according to the present invention is less expensive to manufacture than a ball bearing and does not require an insulating sleeve, allowing the overall cost of manufacturing the apparatus to be reduced.

Figure 7:
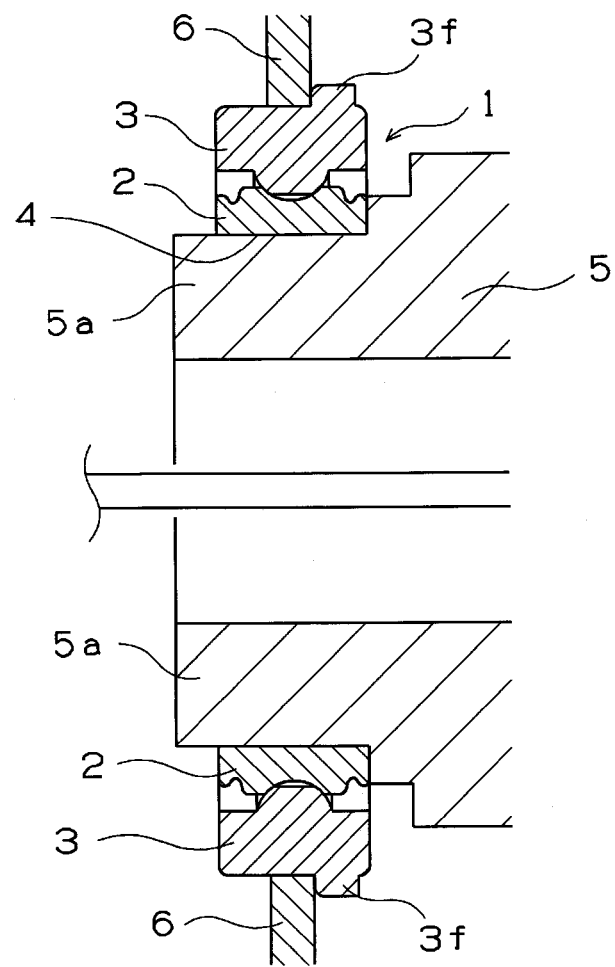
FIG. 7 is a magnified cross-sectional view of a fuser roller-supporting part in an image forming apparatus according to the present invention.

An embodiment of an image forming apparatus according to the present invention will be described with reference to FIG. 7. FIG. 7 is a magnified cross-sectional view of a fuser roller-supporting part in an image forming apparatus. A fuser roller 5 of the image forming apparatus is formed from hollow aluminum, and is heated to roughly 200° C. by a heater provided in the hollow part. A shaft part Sa of the fuser roller 5 is mated to and supported by a bearing hole 4 in an inner ring 2 of a sliding bearing 1. The sliding bearing 1 directly supports the shaft part of the fuser roller without the mediation of an insulating sleeve. The sliding bearing 1 is engaged and aligned with a housing 6 of the image forming apparatus by a flange 3f provided on the outer circumference of the outer ring 3.

The fuser roller 5 bends (curves/flexes) due to high temperatures or loads, and, even if a moment load is generated, aligns at the sliding bearing 1, allowing it to tolerate the load. In order to prevent the fuser roller 5 from accumulating an electrostatic charge and negatively affecting printing quality, the sliding bearing 1 can be configured as an electroconductive bearing as described above. Configuring the sliding bearing 1 as an electroconductive bearing grounds the shaft part 5a via the sliding bearing 1 and the housing 6, allowing for an arrangement in which electricity accumulating on the fuser roller 5 is allowed to escape. If it is necessary that the bearing be non-electroconductive, this can be addressed by making the outer ring non-electroconductive without having to use a separate insulating part such as an insulating sleeve.

Figure 8:
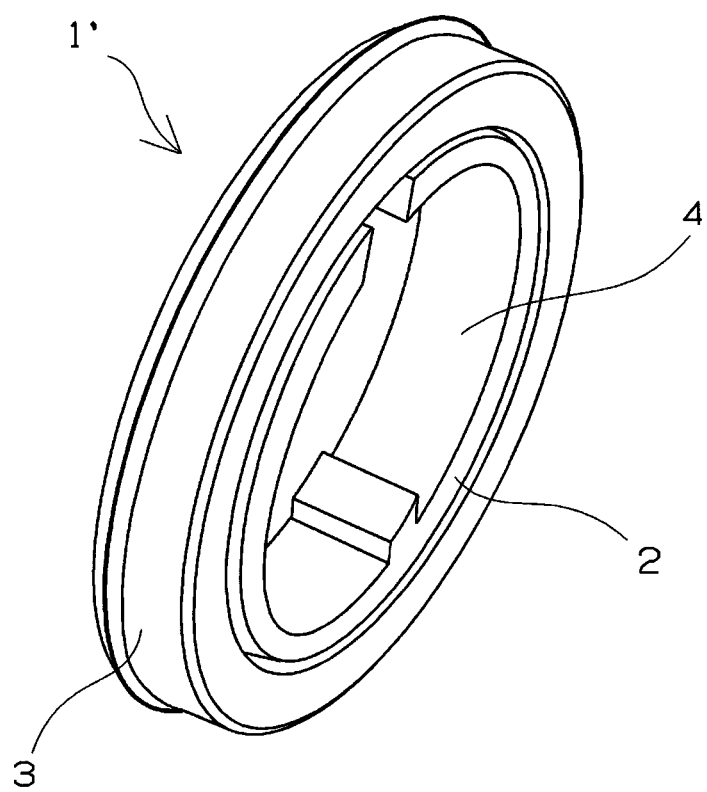
FIG. 8 is a perspective view of another example of a sliding bearing (having an outer ring made of melt-cast metal) according to the present invention.
Figure 9:
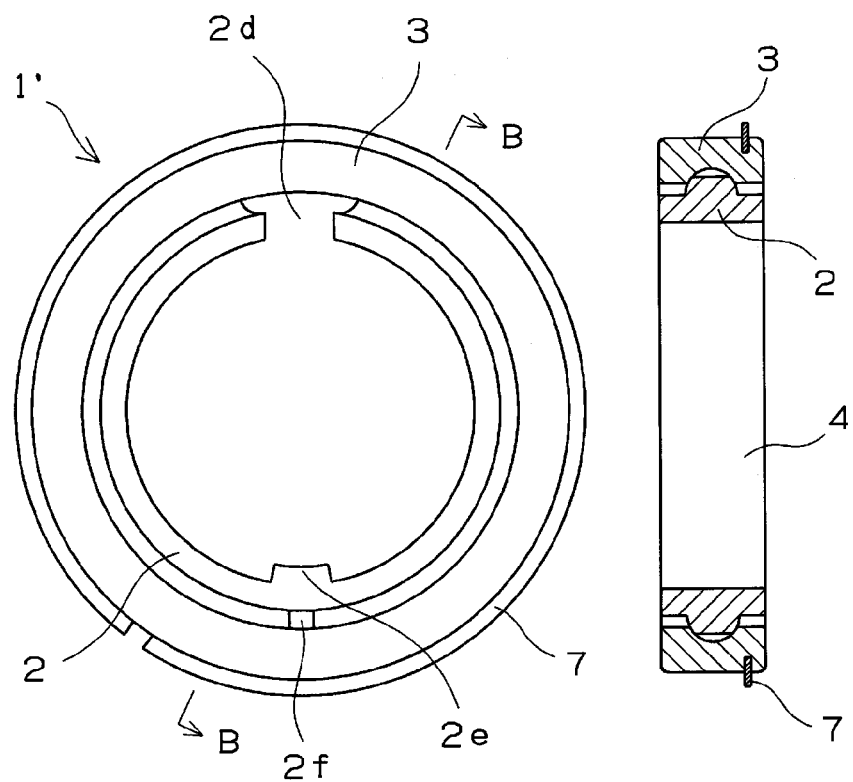
FIG. 9 is a head-on view, axial cross-sectional view, and partially magnified cross-sectional view of the sliding bearing shown in FIG. 8.
Figure 9:
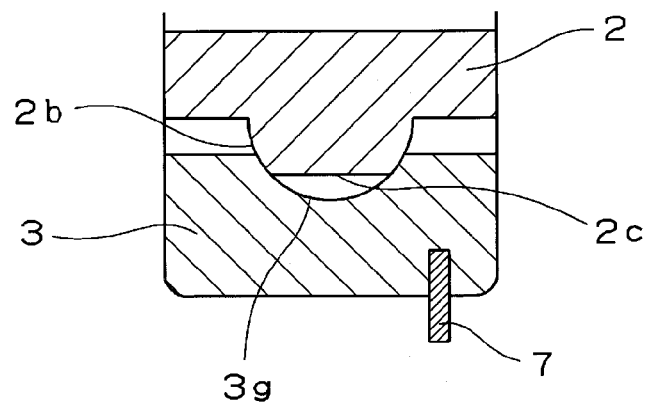

Another embodiment of the sliding bearing according to the present invention (in which the outer ring is made of melt-cast metal) is shown in FIGS. 8 and 9. Whereas FIGS. 1-7 feature a sliding bearing comprising a combination of an inner ring made of melt-cast metal and an outer ring constituted by an article molded from a resin composition, FIGS. 8 and 9 feature a sliding bearing comprising a combination of an outer ring made of melt-cast metal and an inner ring constituted by an article molded from a resin composition. FIG. 8 is a perspective view of a sliding bearing according to the present invention, and FIG. 9 is a head-on view, axial direction cross-sectional view (along line B-B), and partially magnified view of an axial direction cross-sectional view of the sliding bearing. As shown in FIGS. 8 and 9, a sliding bearing 1' is provided with an outer ring 3 of melt-cast metal and an inner ring 2 constituted by an article molded from a resin composition. The sliding bearing 1' is a radial bearing. As shown in FIG. 9, the inner ring 2 comprises a convexly curved surface 2b on the outer circumference and a bearing hole 4 for mating with a support shaft on the inner circumference. The outer ring 3 comprises a concavely curved surface 3g that contacts and slides against the convexly curved surface 2b on the outer circumference of the inner ring 2. The concavely curved surface 3g is provided along part (the central part) of the axial direction of the outer ring 3, and the convexly curved surface 2b along part (the central part) of the axial direction of the outer ring 3. The concavely curved surface 3g on the inner circumference of the outer ring 3 is a concave surface continuously formed in the circumferential direction along the inner circumference of the outer ring 3, and is a concavely curved surface having an arc-shaped (R-shaped) axial cross section. The convexly curved surface 2b on the outer circumference of the inner ring 2 is a convex surface continuously or discontinuously formed along the circumferential direction on the outer circumference of the inner ring 2, and is a convexly curved surface having a roughly arc-shaped (R-shaped, with a partial uncurved surface portion as necessary) axial cross section corresponding to the concavely curved surface 3g of the outer ring 3.

In the sliding bearing 1' of the present embodiment, the constituent members and concave and convex parts are reversed from the sliding bearing shown in FIGS. 1-7, but the bearing is similarly capable of tolerating moment loads and preventing axial direction positional shifting of the outer ring and the inner ring. Moreover, as in the case of the sliding bearing shown in FIGS. 1-7, the radius of curvature of the convexly curved surface 2b on the outer circumference of the inner ring 2 preferably differs from the radius of curvature of the concavely curved surface 3g on the inner circumference of the outer ring 3.

The order in which the sliding bearing according to the present embodiment is assembled is as follows: the inner ring 2 is compressed to equal to or less than the minimum inner diameter of the outer ring 3 so that the concavely curved surface 3g on the inner circumference of the outer ring 3 and the convexly curved surface 2b of the inner ring 2 face and contact one another, and is fitted into the concavely curved surface 3g of the outer ring 3 via elastic deformation. Accordingly, a joint is open in the inner ring 2 following assembly. Thus, even if initial clearance should be lost, clinging can be prevented by the closing of the joint.

In the present embodiment, the operating clearance D' is the inner diameter A' of the concave portion on the inner circumference of the outer ring less the outer diameter B' of the convex portion on the outer circumference of the inner ring. In other words, D'=A'−B'. The operating clearance D' at usage temperature is preferably in a range such that D'/B'=2/1000 to 25/1000. A maximum of 15/1000 is more preferable.

Figure 10:
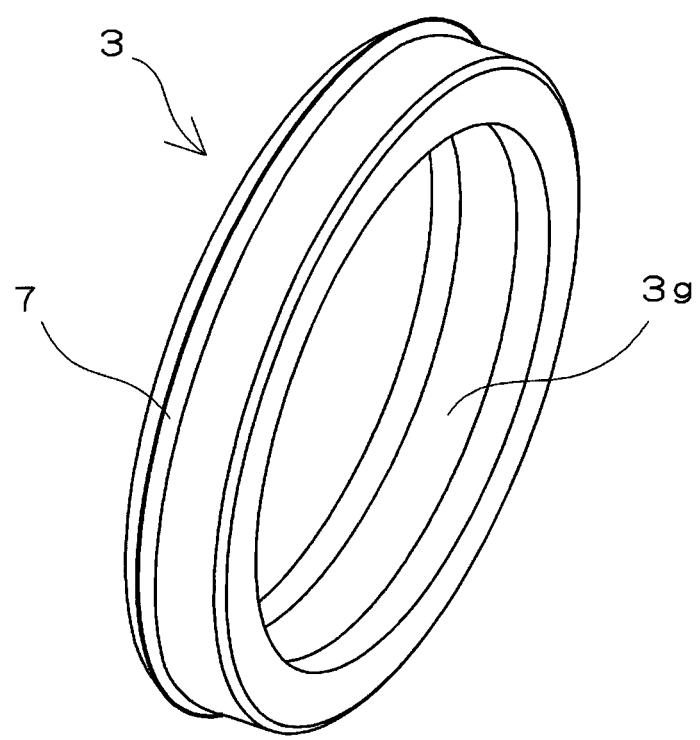
FIG. 10 is a perspective view of only the outer ring of the sliding bearing shown in FIG. 8.

An outer ring 3 of melt-cast metal will be described with reference to FIG. 10. FIG. 10 is a perspective view of only the outer ring of the sliding bearing according to the present embodiment. As shown in FIG. 10, the concavely curved surface 3g on the inner circumference of the outer ring 3 has an arc-shaped (R-shaped) axial cross section. The concavely curved surface 3g constitutes a sliding surface with the inner ring. This shape allows for mitigation of moment loads placed thereupon, and enables reduced torque and wear thanks to stable bearing of pressure.

An outer ring for use in an existing roller bearing, such as a ball bearing, can be repurposed for use as the outer ring 3. In such cases, the concavely curved surface 3g on the inner circumference constituting the sliding surface with the inner ring is an outer ring rolling surface of a roller bearing and exhibits high precision, leading to stabilized rotation performance. There is also no need to manufacture a separate outer ring for use with the sliding bearing according to the present invention, leading to reduced manufacturing costs.

The same metal as used to form the inner ring of the embodiment shown in FIGS. 1-7 can be used as the melt-cast metal forming the outer ring 3 of the present embodiment, and similar effects are yielded thereby. The surface roughness of the concavely curved surface 3g is also preferably no more than 0.3 µm Ra, as in the case of the inner ring of the embodiment shown in FIGS. 1-7.

Figure 11:
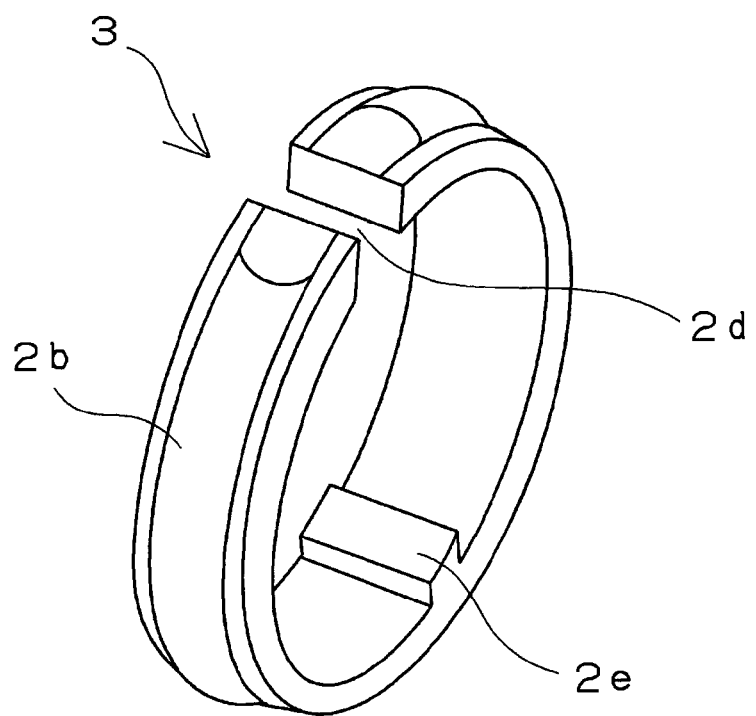
FIG. 11 is a perspective view of only the inner ring of the sliding bearing shown in FIG. 8.
Figure 12:
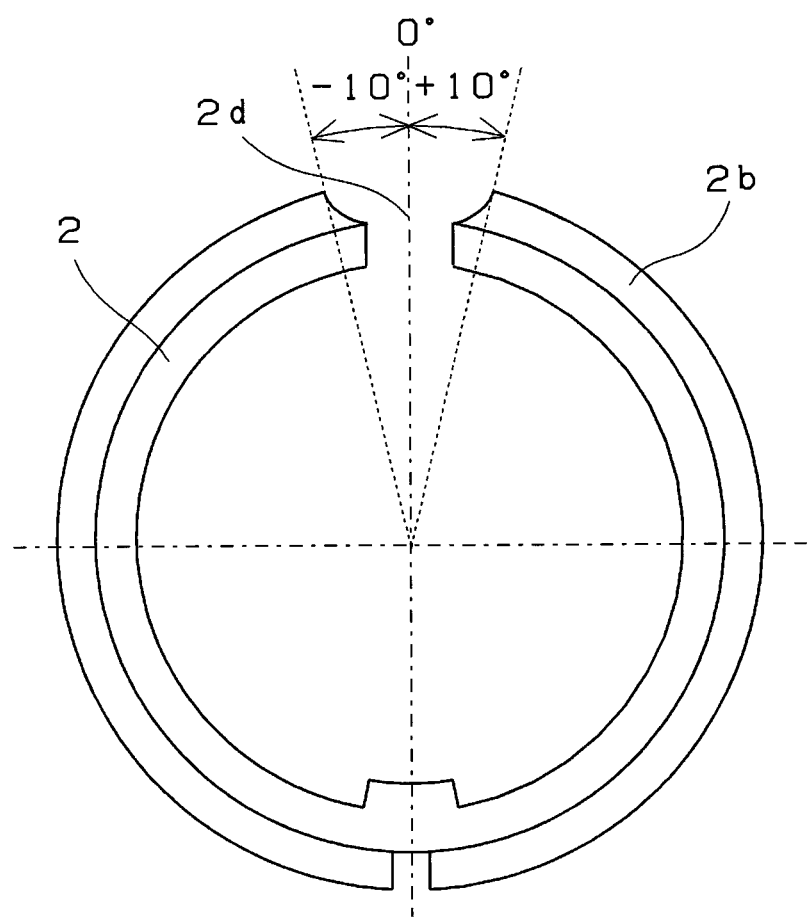
FIG. 12 is a head-on view of only the inner ring of the sliding bearing shown in FIG. 8.

The inner ring 2 constituted by an article molded from a resin composition will be described with reference to FIGS. 11 and 12. FIG. 11 is a perspective view of only an inner ring of the sliding bearing according to the present embodiment, and FIG. 12 is a head-on view of only the inner ring. The inner ring 2 is an annular article comprising, on the outer circumference, a convexly curved surface 2b that faces and contacts the concavely curved surface on the inner circumference of the outer ring. The "annular article" constituting the inner ring encompasses cases in which there is a separated joint and the ring is not closed at one part, as shown in FIG. 11, etc. Any construction such that the inner ring 2 does not come off the outer ring after being combined with the outer ring is acceptable, and any length is acceptable for the circumferential direction length of the annular article as long as it exceeds 180° of the circumference. However, if grease is applied, a length exceeding 340° is preferable in order to avoid grease leakage or contamination of the grease by foreign matter.

The same composition as used to form the outer ring of the embodiment shown in FIGS. 1-7 can be used as the resin composition forming the inner ring 2 of the present embodiment, and similar effects are yielded thereby.

As shown in FIGS. 11 and 12, the inner ring 2 is an annular article having a joint 2d. It is acceptable for there to be a joint 2d in at least one location, or joints may be provided at multiple locations. If the inner ring has joints at multiple locations and comprises multiple conjoined articles, the need to contract the inner ring during the process of assembling it with the outer ring is eliminated, which is useful when the inner ring is formed from a synthetic resin lacking toughness. However, increasing the number of parts in the inner ring increases its price and requires multiple articles to be joined together and fixed in place to prevent the inner ring coming off the outer ring after assembly; thus a single article having a joint at one location is preferable. Having a single joint also facilitates assembly and keeps the inner ring from readily coming off the outer ring after assembly.

It is preferable that the convex portion constituting the convexly curved surface 2b on the outer circumference of the inner ring 2 not be formed within a range of ±10° with respect to the joint 2d, as shown in FIG. 12. In other words, it is preferable that there be no convexly curved surface 2b within this range. There is no particular restriction upon the shape lacking a convexly curved surface as long as there is no convexly curved surface whatsoever, and the outer diameter within this range is less than the outer diameter elsewhere. In this context, "within a range of ±X° with respect to the joint" signifies a range, taking the position of the joint (if constituted by two separated ends, a position centrally located between the end faces in the circumferential direction) on the circumference of the annular inner ring as 0°, encompassed by a central angle of ±X° from this position. In FIG. 12, the convex portion of the inner ring 2 is not formed in a range of ±10° with respect to the joint 2d.

In the case of an inner ring having multiple joints, the joints constitute seams, and may protrude towards the outer diameter side in sliding contact with the outer ring. In such cases, not only the load-bearing portions but also the joints of the inner ring slidingly contact the outer ring, destabilizing friction torque. In the case of an inner ring having only one joint, the joint may bulge outward in the direction of the outer diameter, similarly destabilizing friction torque. Not forming the convex portion constituting the convexly curved surface of the inner ring within a range of ±10° with respect to the joint keeps the joint (i.e., the convex portion on the outer circumference of the inner ring in the vicinity of the joint) from slidingly contacting the outer ring, promoting stabilized friction torque and improved bearing reliability.

As in the case shown in FIG. 5, the two ends of the convex portion constituting the convexly curved surface 2b on the outer circumference of the inner ring 2 preferably form an angle of 90° or less with respect to the tangent line of the inner circumference of the outer ring. An angle of 60° or less is more preferable. If the two ends have arc-shaped surfaces, as shown in FIG. 12, a straight line connecting the two arc-shaped ends in cross section preferably forms the above-mentioned angle with respect to the tangent line of the outer circumference of the inner ring. When subjected to a large moment load, the load-bearing portion and the opposite side 180° away both slidingly contact the outer ring. This is because, in such cases, there is the possibility of the outer ring contacting the convex portion on the outer circumference of the inner ring, and the physical edge effect during contact is reduced. If grease is applied, the arrangement described above is capable of preventing grease from being scraped off by the ends of the convex portion of the outer circumference, stabilizing the supply of grease to the frictional surfaces. In FIG. 12, the two ends of the convex portions on the inner circumference of the inner ring form angles of 45° with respect to the tangent line of the inner circumference of the inner ring.

It is preferable that an uncurved surface portion 2c be formed on the convexly curved surface 2b of the inner ring 2 along the entire circumference of the central part of the axial direction of the convexly curved surface 2b, as shown in FIG. 9. The uncurved surface portion 2c can be, for instance, a flat-shaped portion having a linear axial cross section. By forming an uncurved surface portion 2c along the entire circumference of the center part of the axial direction, as shown in FIG. 9, it is possible for the concavely curved surface 3g of the outer ring 3 to contact not just one, but two locations on the apex of the convexly curved surface 2b of the inner ring 2 as seen in axial cross section, allowing axial backlash between the inner and outer rings to be suppressed. Friction torque is also stabilized. In addition, the maximum outer diameter is reduced, yielding superior ease of assembly with the outer ring.

If the inner ring 2 is an injection-article molded from a resin composition, an injection molding parting line is preferably formed on the uncurved surface portion 2c. This arrangement facilitates injection molding of the inner ring and prevents interference with the sliding contact surface of the inner ring even if burring or flash forms on the parting line, as well as negative effects upon frictional forces.

If a lubricant such as grease or lubricating oil is disposed between the inner and outer rings, the formation of an uncurved surface portion 2c ensures that a hollow part is present between the uncurved surface portion 2c and the concavely curved surface 3g on the inner circumference of the outer ring 3. This part constitutes a lubricant-retaining groove, and also serves to retain the lubricant (see FIG. 9). The same grease or lubricating oil as in the embodiment shown in FIGS. 1-7 can be used.

If a lubricant such as grease or lubricating oil is disposed between the inner and outer rings, it is preferable to form at least one lubricant-retaining groove 2f constituted by an axial-direction indentation on the load-bearing portion of the outer circumference of the inner ring 2. If the load-bearing portion is at a fixed location, a lubricant-retaining groove is preferably disposed at one location on the load-bearing portion, as shown in FIG. 9. If the load-bearing portion varies or shifts according to the structure of the apparatus, the location at which the bearing is used, or the method by which the bearing is used, it is also possible to provide a lubricant-retaining groove along the entire circumference of the outer diameter, or at multiple locations corresponding to load-bearing portions.

There is no particular limitation upon the depth of the lubricant-retaining groove from the apex of the convex portion on the outer circumference of the inner ring or the circumferential direction width thereof, but a depth of at least 0.5 mm and a circumferential direction width of at least 0.5 mm are preferable in order to obtain grease-retaining effects. However, if the circumferential direction width is too great, the possibility of backlash contact with the bottom of the groove arises; thus, the circumferential direction wide is preferably no more than 10% of the outer diameter of the inner ring.

It is preferable to provide at least one non-sliding surface selected from a recessed detent, a raised detent, and a flange on the non-sliding surfaces of the outer ring and the inner ring for the sake of alignment within a device such as a fuser device, or for mounting to the device or a shaft. In FIG. 9, a raised detent 2e is provided on the inner ring 2 and a metal check ring 7 on the outer ring 3. The raised detent 2e mates with a concave portion (not shown) formed in a shaft or the like. As a result, the occurrence of problems such as the joint 2d becoming a load-bearing portion or the lubricant-retaining groove 2f shifting from the load-bearing portion can be suppressed.

The sliding bearing combining an inner ring made of melt-cast metal and an outer ring constituted by an article molded from a resin composition is suited for applications in which the inner ring rotates during shaft rotation, and the sliding bearing combining an outer ring made of melt-cast metal and an inner ring constituted by an article molded from a resin composition is suited for applications involving outer ring rotation when the housing around the outer circumference rotates, respectively.

There is no particular limitation upon the operating mode (unidirectional rotation, rocking rotation) of the bearing, the rotation of the inner ring, and the rotation of the outer ring. However, if the convexly curved surface on the inner circumference of the outer ring is not formed in parts, the edge of the convexly curved surface will contact the inner ring when the outer ring rotates. Thus, it is preferable that the convexly curved surface be formed along the entirety of the inner circumference of the outer ring when the bearing is used in an arrangement in which the outer ring rotates. Similarly, if the convexly curved surface on the outer circumference of the inner ring is not formed in parts, it is preferable that the convexly curved surface be formed along the entirety of the outer circumference of the inner ring when the bearing is used in an arrangement in which the inner ring rotates.

Figure 13:
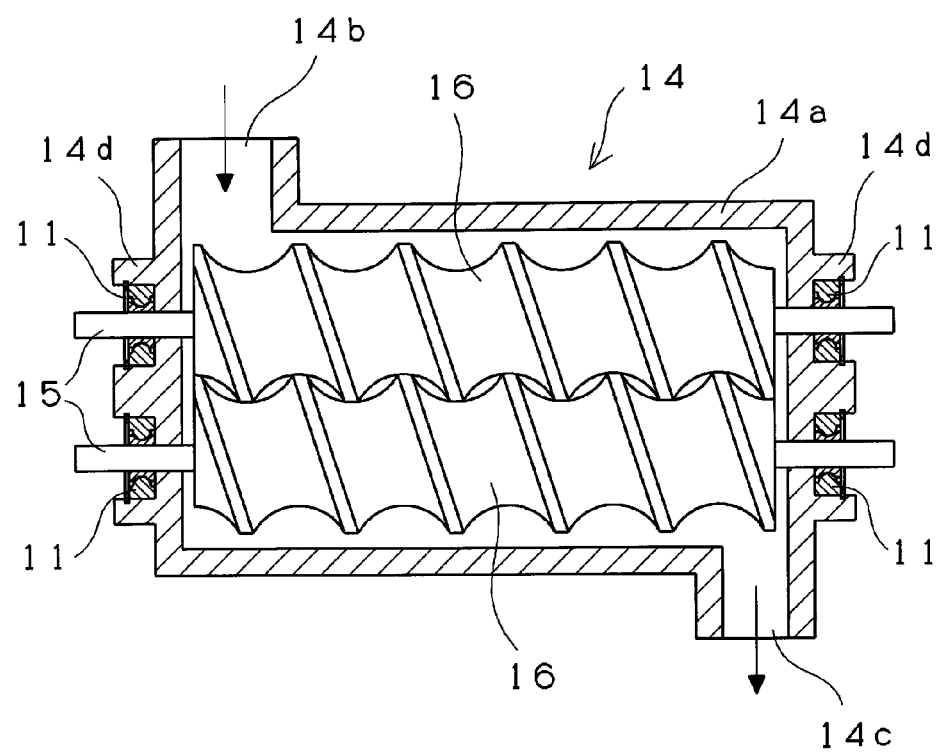
FIG. 13 is a cross-sectional view of an example of a food product processing machine using the sliding bearing according to the present invention.
Figure 14:
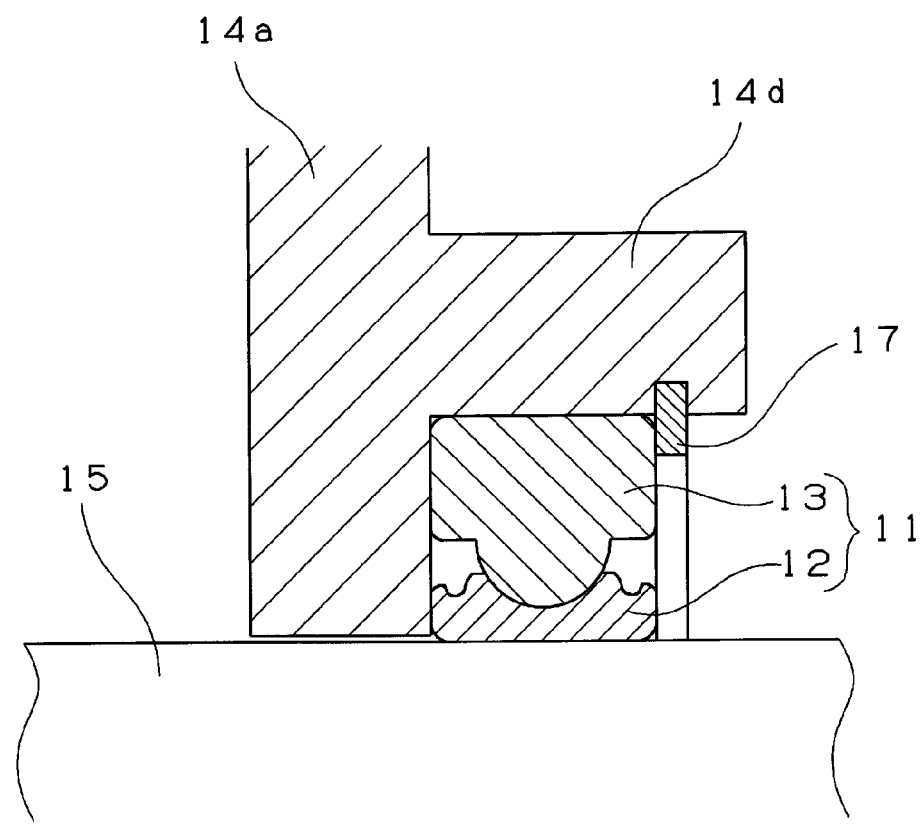
FIG. 14 is a magnified view of the vicinity of the bearing shown in FIG. 13.

Another embodiment of the present invention will be described with reference to FIGS. 13 and 14. FIG. 13 is a cross-sectional view of an example of a food product processing machine using the sliding bearing according to the present invention, and FIG. 14 is a magnified view of the vicinity of the bearing shown in FIG. 13. As shown in FIG. 13, sliding bearings 11 according to the present invention are sliding bearings for supporting blending rotary shafts 15 laid laterally over a casing 14a of a food product processing machine 14 for kneading food products. The food product processing machine 14 conveys raw food materials introduced via an inlet 14b into the casing 14a to the right while blending it using screw blades 16 provided on rotary shafts 15 rotatably driven by a motor (not shown), and the blended food product is ejected via an outlet 14c.

As shown in FIG. 14, the sliding bearings 11 are contained within bearing cases 14d provided on both the left and right end of the casing 14a, and support the two ends of the rotary shafts 15. The sliding bearings 11 are radial sliding bearings constituted by two members, an inner ring 12 and an outer ring 13, and are subjected to loads in the radial direction. The outer ring 13 is mounted to the bearing cases 14d by a retaining ring 17, and the inner ring 12 is attached to the rotatably driven rotary shaft 15.

One of the inner ring 12 or the outer ring 13 comprises stainless steel having a concavely curved surface along part of the axial direction, and the other comprises an article molded from a resin composition having a convexly curved surface along part of the axial direction that contacts and slides against the concavely curved surface, and the inner ring 12 and the outer ring 13 relatively rotate without contacting each other apart from the contacting parts of the convexly curved surface and the concavely curved surface. The details of the shape of the bearing are identical to those shown in FIGS. 1-6 and 8-12.

In a food product machine, there is the possibility of material components escaping from the parts and contaminating the food product not only, as shall be apparent, at parts directly contacting the raw food materials or the finished (or semi-finished) food products, but also at parts not directly contacting the raw food materials or the finished (or semi-finished) food products during processing of raw food materials or finished (or semi-finished) food products. For this reason, the resin forming the outer ring 12 or the inner ring 13 must be a synthetic resin that is highly safe for food products. It is preferable to select a material for use in food product machinery other than general industrial materials according, for example, food product and additive standards set forth in the Food Sanitation Act, FDA standards, and approval standards such as the USDA's H-1 designation constituting statutory material sanitation standards for food product applications.

In food product machine applications, fluororesins such as PFA resin, FEP resin, and ETFE resin and PBT resins such as PA resin, POM resin, PEEK resin, PPS resin, PET resin, and PBT resin can be used as the base resin of the resin composition forming the outer ring or the inner ring. Fluororesins, PA resin, and POM resin have been certified as safe even when they come into contact with and contaminate food products according to the food product and additive standards set forth in the Food Sanitation Act and FDA standards. PEEK resin, PET resin, and PBT resin have been certified as safe even when they come into contact with and contaminate food products according to FDA standards. PPS resin has been certified in FDA standards and by the U.S. National Science Foundation (NSF) as safe for use with parts coming into contact with food product machinery, kitchen tools, and drinking water.

A biodegradable resin can also be used. Biodegradable resins have been confirmed as safe when coming into contact with and contaminating food products in the safety standards of the Japan Hygienic Olefin And Styrene Plastics Association. Examples of biodegradable resins include poly (alpha-hydroxy acid), poly(beta-hydroxyalkanoate), poly (omega-hydroxyalkanoate), and polyalkylene alkanoate. Examples of poly(alpha-hydroxy acid) include polylactic acid and polyglycolic acid, and an example of a poly(beta-hydroxyalkanoate) is a copolymer of hydroxyvaleric acid and hydroxybutyric acid. Examples of polyalkylene alkanoates include a dehydrated condensate of 1,4-butanediol and succinic acid (i.e., polybutylene succinate (PBS)), and polyethylene terephthalate copolymers such as polyethylene terephthalate-butylene-adipate copolymer.

Of the abovementioned resins, PPS resin, POM resin, and PA resin are especially preferable in terms of exhibiting sufficient heat resistance and mechanical strength in food product machine applications and meeting statutory sanitation standards for materials used in food product applications.

It is also preferable to include the PTFE resin described above as a solid lubricant in the resin composition forming the outer ring or the inner ring in the case of food product machine applications as well. Mica, talc, or calcium carbonate can be added as reinforcing materials. Mica, talc, and calcium carbonate have been certified by FDA standards as being safe even when coming into contact with and contaminating food products. Preferable proportions for added solid lubricant and reinforcing materials are as discussed above. Any known resin additive that meets statutory sanitation requirements for materials used in food product applications may also be included in the resin composition to the extent that the effects of the present invention are not inhibited.

A sliding bearing for food product machine applications is used in conditions in which the bearing comes into direct or indirect contact with raw food materials or finished (or semi-finished) food products, especially in severe usage conditions, such as in salt solutions or the like. Thus, stainless steel is used as the melt-cast metal forming the outer ring or the inner ring from considerations of both sanitation and rust prevention. Martensitic SUS 440C is preferably used as the stainless steel.

In food product machine applications, it is not necessarily essential to use a lubricant such as grease or a lubricating oil on the sliding surfaces of the inner ring and the outer ring, but, if a lubricant such as grease or a lubricating oil is used, a non-toxic lubricant that passes or complies with (i.e. meets standards similar to), for example, the USDA H-1 designation or FDA standards is acceptable.

A grease containing at least one base oil selected from liquid paraffin oil, poly-alpha-olefin oil, vegetable oil, animal oil, fluorinated oil, ester oil, silicone oil, and alkylene glycol oil and containing at least one compound selected from an aluminum conjugate soap, calcium hydrostearate, polyurea, clay, and fluororesin as a thickener can be used as a lubricant of this sort. Commercially available greases meeting FDA and USDA standards may also be used. The abovementioned oils may also be used as lubricating oils. Because a lubricating oil may escape from between the inner ring and the outer ring, a grease, which is not readily extruded outside the sliding bearing, is preferable.

Of the foregoing, liquid paraffin oil, poly-alpha-olefin oil, vegetable oil, and animal oil meet the USDA H-1 designation and FDA standards as non-toxic substances.

The abovementioned liquid paraffin oil is a hydrocarbon oil that is highly refined by cleaning off comparatively light lubricating oil fractions using sulfuric acid, is primarily constituted by alkylnaphthenes, and are listed in the Japanese Standard of Food Additives and the Japanese Pharmacopoeia as medicinal liquid paraffin. This is also equivalent to food additive liquid paraffin oil and pharmaceutical liquid paraffin oil in the United States, the United Kingdom, and Germany.

The abovementioned poly-alpha-olefin oil has been rated by the USDA H-1 designation as completely non-toxic to the human body even when coming into direct contact with food product, and is a synthetic hydrocarbon oil not containing impurities such as aromatic hydrocarbons or sulfide compounds.

The abovementioned vegetable oil is a known natural oil that can be used as a food product or food product additive, with specific examples including camellia oil, olive oil, peanut oil, castor oil, and rapeseed oil. The abovementioned animal oil capable of being used in the present invention is a known natural oil that can be used as a food product or food product additive, with specific examples including silkworm chrysalis oil, beef tallow, lard, sardine oil, and herring oil.

The abovementioned fluorinated oil meets the USDA H-1 designation and comprises three atoms, carbon, fluorine, and oxygen, and has, for example, the molecular structure shown in the following formula (3) or formula (4). In the formulas, n, m, p, and q represent arbitrarily selected integers.

[Formula 3]

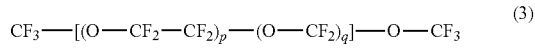

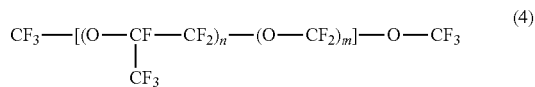

Of the abovementioned oils, ester oil, silicone oil, and polyalkylene glycol oil meet the USDA H-1 designation and FDA standards as substances that are not toxic to the human body if used at less than predetermined concentrations.

The abovementioned ester oil is a known ester oil having a —COO— structure, such as diacid ester oil, polyol ester oil, phosphate ester oil, or silicate ester oil, and is a synthetic oil constituted by a compound designated in FDA standards as an indirect food additive. Specific examples of ester oils designated in FDA standards include monohydrogen phosphate ester oil and dihydrogen phosphate ester oil.

The abovementioned silicone oil is a silicone oil known as a polymeric synthetic oil and designated in FDA standards, with an example being a silicone oil (such as dimethyl polysiloxane oil) represented by the following formula (5). In the formula, n is an arbitrarily selected integer, and R is an isolated methyl group or phenyl group or a mixed group.

[Formula 4]

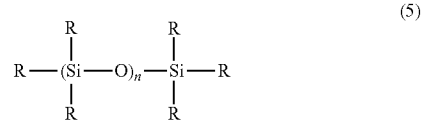

Specific examples of such silicone oils (organopolysiloxane oils) include alkylmethyl silicone oils such as dimethyl silicone oil, and phenylmethyl silicone oil.

The abovementioned polyalkylene glycol oil is a polyethylene glycol oil, polypropylene glycol, or the like that is known as a synthetic oil and is an FDA-designated synthetic oil.

If there is a risk of electrostatic dust explosions of materials supplied to the food product machine, the sliding bearing must be electroconductive. Electroconductivity is imparted, as described above, by adding electroconductive carbon or graphite to the inner ring or outer ring constituting the resin part and the lubricant interposed between the inner and outer rings. Because the electroconductivity-imparting graphite or carbon is black in color, its use should be avoided to the extent possible if electroconductivity is unnecessary in a food product machine out of considerations of sanitary impression.

EXAMPLES

Examples 1-8

Using an injection-molded resin article for the outer ring and a machined (turned, ground) article of melt-cast metal as the inner ring, grease was interposed between the inner and outer rings according to the arrangement shown in FIG. 1 to create a test bearing. The primary dimensions were as follows.

Inner ring: φ 25×φ 27.5 (outer circumference concave portion)×7 mm
Outer ring: φ 27.78 (inner circumference convex portion)×φ 37×7 mm
Sliding contact radius: φ 27.5 mm The material, concavely curved surface machining method, and surface roughness of the inner ring and the material, composition, and grease type of the outer ring are shown in Table 1. The inner rings of examples 1-8 are repurposed inner rings for 6805 ball bearings, with finished products being used as the inner rings of examples 1-3 and 6-8 and unfinished products being used as the inner rings of examples 4 and 5. 0.3 g grease was applied to the entire sliding surfaces (both sides) of the inner and outer rings, after which the outer ring was expanded and fitted to the inner ring, as shown in FIG. 3.

In all of the examples, the convex portions on the inner circumferences at the joints in the outer rings were not formed within ranges of ±10° with respect to the joints, and the two ends of the convex portions formed 45° angles with respect to the tangent lines of the inner circumferences of the outer ring, as shown in FIGS. 2 and 5. The radius of curvature of the concavely curved surface on the outer circumference of the inner ring was R 1.785-1.81 mm, the radius of curvature of the convexly curved surface on the inner circumference of the outer ring was 1.7-1.75 mm, and the radii of curvature were such that that of the concavely curved surface on the outer circumference of the inner ring was greater than that of the concavely curved surface on the inner circumference of the outer ring.

In all of the examples, the joints in the outer rings were placed in an abutting state prior to testing, and the inner diameter of the convex portion was greater than the outer diameter of the concave portion on the outer circumference of the inner ring, the difference therebetween being 0.28 mm. Specifically, the difference in radius was the operating clearance of the test bearing at room temperature, 0.28 mm ($10/1000$ of the outer diameter of the concave portion on the outer circumference of the inner ring). In examples 1-6, the operating clearance at 180° C. was 0.41 mm ($15/1000$ of the outer diameter of the concave portion on the outer circumference of the inner ring).

The outer ring was an injection-molded article of synthetic resin, and the convexly curved surface on the inner circumference of the outer ring had an uncurved surface portion formed along the entire circumference of the center of the axial direction, on which a parting line was formed.

The lubricant-retaining grooves in the outer rings in examples 1, 2, and 4-8 were as shown in FIGS. 2 and 4, with a 2 circumferential direction width×1 mm depth groove being provided at one location on the load-bearing portion. In example 3, a lubricant-retaining groove was not formed. In all examples, the flange and recessed detent shown in FIG. 4 were formed on the outer ring.

The raw materials of the resin materials used in the outer rings of the examples and the comparative examples are summarized below.

(1) PPS resin (PPS): Susteel #160 (semi-crosslinked); Tosoh Corporation
(2) Modified PA6T resin (PA6T): ARLEN™ AE4200; Mitsui Chemicals, Inc.
(3) POM resin (POM): Duracon® SW-01; Polyplastics Co., Ltd.
(4) Graphite (GRP): TIMREX KS6 (average particle diameter: 6 μm); Timcal Japan)
(5) PTFE resin (PTFE): KTL-610 (recycled PTFE); Kitamura Limited.
(6) Electroconductive carbon (CB): Ketjenblack EC-600 JD; Lion Corporation.

Comparative Examples 1 Through 4

For comparative examples 1 and 2, NTN-manufactured 6805 ZZ ball bearings (inner diameter φ 25×outer diameter φ 37×width 7 mm) for fuser rollers were used as test bearings. A non-electroconductive fluorinated grease (Noxlub BF4023; NOK Klüber) was enclosed in comparative example 1, and a non-electroconductive lithium grease (Multemp SRL; Kyodo Yushi Co., Ltd.) in comparative example 2. A retaining ring was attached as a flange.

In comparative examples 3 and 4, injection molded resin sliding bearings (φ 27.5×φ 34×7 mm) were used as test bearings. The materials of the resin sliding bearings are shown in Table 2. The operating clearance of the resin counterpart shaft and the test bearing was 0.28 mm ($10/1000$ of the diameter of the counterpart shaft). A flange and a raised detent were formed on the outer circumference of the resin sliding bearing.

TABLE 1

| | Example | | | |
|---|---|---|---|---|
| | 1 | 2 | 3 | 4 |
| Inner ring | | | | |
| Material | SUJ2 | SUJ2 | SUJ2 | SUJ2 |
| Tempered | Yes | Yes | Yes | Yes |
| Processing method | Superfinishing | Superfinishing | Superfinishing | Grinding |
| Surface roughness (μmRa) | 0.03 | 0.03 | 0.03 | 0.1 |
| Outer ring | | | | |
| Material | | | | |
| (compounding ratio vol %) | | | | |
| Resin | | | | |
| PPS | 70 | 70 | 70 | 70 |
| PA6T | — | — | — | — |
| POM | — | — | — | — |
| Filler | | | | |
| PTFE | 30 | 25 | 30 | 30 |
| Graphite | — | 5 | — | — |
| CB | — | — | — | — |

TABLE 1-continued

| | | | | |
|---|---|---|---|---|
| Volume resistivity (Ω · cm) (JIS K 7194) | ×10$^{13}$ or more (non-electro-conductive) | ×10$^{13}$ or more (non-electro-conductive) | ×10$^{13}$ or more (non-electro-conductive) | ×10$^{13}$ or more (non-electro-conductive) |
| Lubricant retaining groove | Yes | Yes | No | Yes |
| Grease material[1)] | A | A | A | A |
| Number of parts | 2 (inner ring, outer ring) | 2 (inner ring, outer ring) | 2 (inner ring, outer ring) | 2 (inner ring, outer ring) |
| Testing conditions (1) | | | | |
| Coefficient of friction | 0.05 | 0.04 | 0.07 | 0.06 |
| Wear level (mm) | 0.01 | 0.01 | 0.02 | 0.02 |
| Testing conditions (2) | | | | |
| Coefficient of friction | — | — | — | — |
| Wear level (mm) | — | — | — | — |

| | Example | | | |
|---|---|---|---|---|
| | 5 | 6 | 7 | 8 |
| Inner ring | | | | |
| Material | SUJ2 | SUJ2 | SUJ2 | SUJ2 |
| Tempered | No | Yes | Yes | Yes |
| Processing method | Turning | Superfinishing | Superfinishing | Superfinishing |
| Surface roughness (μmRa) | 0.3 | 0.03 | 0.03 | 0.03 |
| Outer ring | | | | |
| Material (compounding ratio vol %) | | | | |
| Resin | | | | |
| PPS | 70 | 70 | — | — |
| PA6T | — | — | 100 | — |
| POM | — | — | — | 100 |
| Filler | | | | |
| PTFE | 30 | 25 | — | — |
| Graphite | — | — | — | — |
| CB | — | 5 | — | — |
| Volume resistivity (Ω · cm) (JIS K 7194) | ×10$^{13}$ or more (non-electro-conductive) | ×10$^{3}$ (electro-conductive) | ×10$^{13}$ or more (non-electro-conductive) | ×10$^{13}$ or more (non-electro-conductive) |
| Lubricant retaining groove | Yes | Yes | Yes | Yes |
| Grease material[1)] | A | B | C | C |
| Number of parts | 2 (inner ring, outer ring) | 2 (inner ring, outer ring) | 2 (inner ring, outer ring) | 2 (inner ring, outer ring) |
| Testing conditions (1) | | | | |
| Coefficient of friction | 0.08 | 0.06 | — | — |
| Wear level (mm) | 0.03 | 0.01 | — | — |
| Testing conditions (2) | | | | |
| Coefficient of friction | — | — | 0.05 | 0.07 |
| Wear level (mm) | — | — | 0.01 | 0.01 |

[1)]A: Non-electroconductive fluorinated grease (Noxlub BF 4023; produced by NOK Kluber; base oil viscosity: 390 mm$^2$/s(40° C.), 7 mm$^2$/s(180° C.) B: Electroconductive fluorinated grease (Barrierta BFX3; produced by NOK Kluber; bass oil viscosity: 390 mm$^2$/s(40° C.), 7 mm$^2$/s(180° C.) C: Non-electroconductive lithium grease (Multemp SRL; produced by Kyodo Yushi Co., Ltd.; base oil viscosity: 26 mm$^2$/s

TABLE 2

| | Comparative example | | | |
|---|---|---|---|---|
| | 1 | 2 | 3 | 4 |
| Type | Ball bearing | Ball bearing | Resin sliding bearing | Resin sliding bearing |
| Resin material | | | | |
| Material (compounding ratio vol %) | | | | |
| Resin | | | | |
| PPS | — | — | 70 | — |
| PA6T | — | — | — | 100 |
| Filler | | | | |
| PTFE | — | — | 30 | — |
| Volume resistivity (Ω · cm) (JIS K 7194) | — | — | ×10$^{13}$ or more (non-electro-conductive) | ×10$^{13}$ or more (non-electro-conductive) |
| Grease material[1)] | A | C | No | No |
| Number of parts | 6[2)] | 6[2)] | 1 | 1 |

TABLE 2-continued

|  | Comparative example | | | |
|---|---|---|---|---|
|  | 1 | 2 | 3 | 4 |
| Testing conditions (1) | | | | |
| Coefficient of friction | 0.01 | — | 0.15 | — |
| Wear level (mm) | None (not measurable) | — | 0.15 | — |
| Testing conditions (2) | | | | |
| Coefficient of friction | — | 0.01 | — | 0.20 |
| Wear level (mm) | — | None (not measurable) | — | 0.15 |

[1]A: Non-electroconductive fluorinated grease (Noxlub BF 4023; produced by NOK Kluber) C: Non-electroconductive lithium grease (Multemp SRL; produced by Kyodo Yushi Co., Ltd.)
[2]Inner ring, outer ring, seals(2), balls(15), retainer, retaining ring <Manufacturing Costs>

Taking the manufacturing cost of the sliding bearing of example 1 as 100 (baseline), the relative manufacturing costs (calculated costs) for examples 1-6 and comparative examples 1 and 3 are compared in Table 3.

TABLE 3

|  | Example | | | | Comparative example | |
|---|---|---|---|---|---|---|
|  | 1 | 2, 3 | 4, 5 | 6 | 1 | 3 |
| Manufacturing costs | 100 | 100 | 95 | 100 | 250 | 60 |

<Friction Wear Test>

Using a radial testing device, the coefficient of friction of the test bearing was measured. A cartridge heater was inserted into the center of the counterpart shaft in the radial testing device, allowing the counterpart shaft to be heated, and the shaft surface temperature to be controlled by a thermocouple. The test bearing was mounted to a specialized housing, in which state the counterpart shaft was passed through the inner diameter, a load was placed on the lower part of the specialized housing, and the counterpart shaft was rotated. Testing conditions are shown in Table 4. Testing conditions (1) was a high temperature mimicking the conditions for a fuser roller of a fuser device in a photocopier, and testing condition (2) was room temperature (25° C.) mimicking the conditions for a bearing in a transfer unit. Coefficients of friction and wear levels after 20 hours are listed together in Tables 1 and 2.

TABLE 4

| Item | Testing conditions (1) | Testing conditions (2) |
|---|---|---|
| Load | 280 N (surface pressure 1.5 Mpa) | 280 N (surface pressure 1.5 Mpa) |
| Rotational speed | 210 min$^{-1}$ (18 m/min velocity) | 115 min$^{-1}$ (10 m/min velocity) |
| Counterpart shaft | Aluminum alloy (A5052)/ surface roughness 0.5 μmRa | SUM + Ni plating/ surface roughness 0.5 μmRa |
| Temperature | 180° C. | Room temperature (25° C.) |
| Time | 20 hours | 20 hours |

As shown in Table 1, examples 1-8, which were articles according to the present invention comprising only two parts, had low friction and low wear. In particular, examples 1, 2, 7, and 8, in which a bearing inner ring was used and a lubricant-retaining groove was formed in the inner circumference of the outer ring, had extremely low friction and low wear. In addition, manufacturing costs were half or less of those for ball bearings comprising large numbers of parts. Meanwhile, while comparative examples 3 and 4, which were resin sliding bearings, were inexpensive, their coefficients of friction were two and three times greater and their wear levels five times greater, indicating inferior friction wear properties.

<Relationship Between Operating Clearance and Coefficient of Friction>

Figure 15:
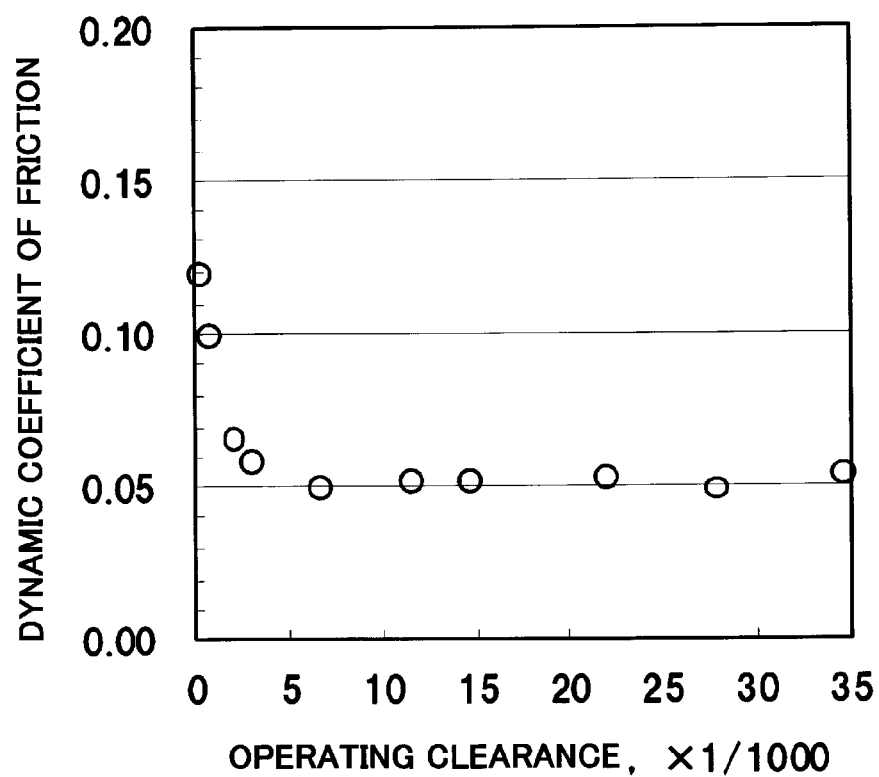
FIG. 15 is a graph showing the relationship between operating clearance and coefficient of friction at 180° C.

Using the test bearing of example 1 (with modifications to the inner diameter dimension of the outer ring) as a test specimen, the relationship between operating clearance and coefficient of friction was investigated using testing conditions (1) shown in Table 4 as the testing condition. Operating clearance at a testing temperature of 180° C. was altered by making various modifications to the inner diameter dimension of the outer ring of the bearing test specimen of example 1 in order to determine the relationship between (operating clearance (mm)/outer diameter (mm) of the concave portion on the outer circumference of the inner ring) (simply referred to as "operating clearance" in FIGS. 15 and 17) and coefficient of friction after 20 hours of testing. Results are shown in FIG. 15. As shown in FIG. 15, the coefficient of friction greatly increased when [operating clearance (mm)/outer diameter (mm) of the concave portion on the outer circumference of the inner ring] was less than 2/1000.

<Relationship Between Grease Base Oil Dynamic Viscosity and Coefficient of Friction>

Figure 16:
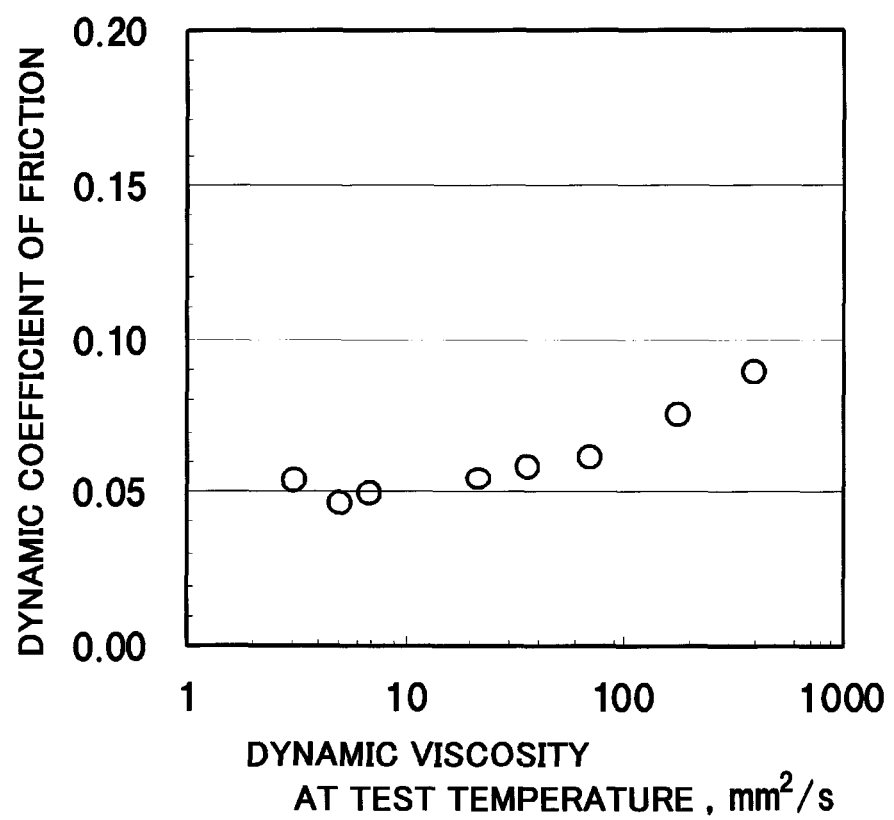
FIG. 16 is a graph showing the relationship between oil dynamic viscosity and coefficient of friction at a testing temperature.

Using the test bearing of example 1 as a test specimen, the relationship between grease base oil dynamic viscosity and coefficient of friction was investigated using testing conditions (1) shown in Table 4 (with temperature modifications) as the testing conditions. The dynamic viscosity of the base oil of a fluorinated grease was altered within a range of 2-390 mm$^2$/s by altering the testing temperature shown under testing conditions (1) shown in Table 4 (to 40° C., 100° C., 180° C., and 200° C.) to determine the relationship between the dynamic viscosity of the base oil and the coefficient of friction after 20 hours of testing. Results are displayed in FIG. 16. As shown in FIG. 16, it is apparent that there is a tendency for the coefficient of friction to increase along with the dynamic viscosity of the base oil of the grease.

<Changes in Coefficient of Friction Against Product of Operating Clearance and Grease Base Oil Dynamic Viscosity>

Figure 17:
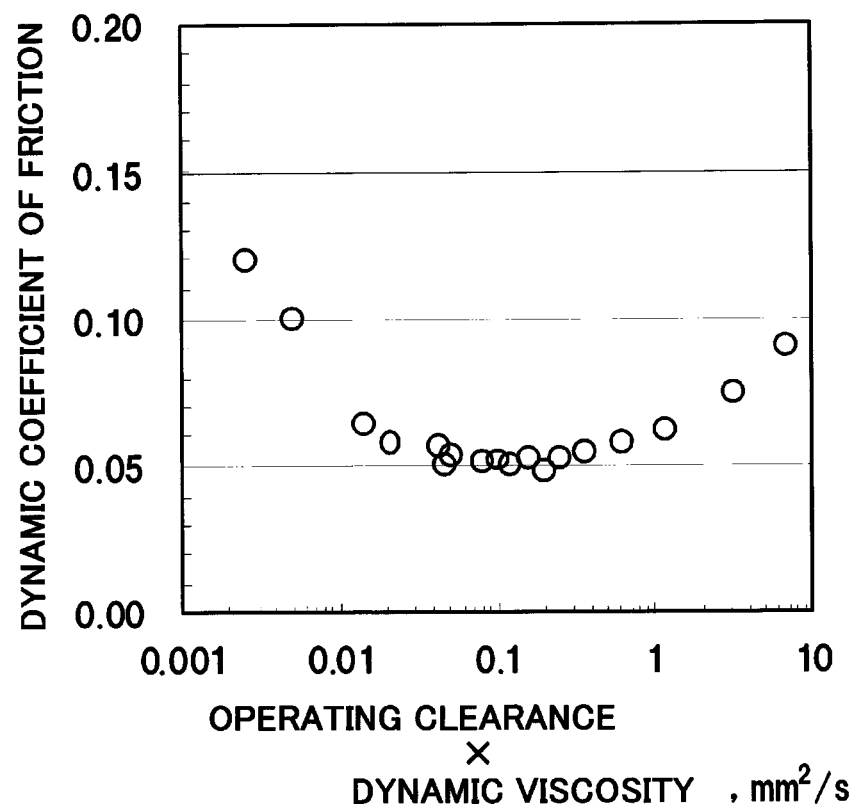
FIG. 17 is a graph showing the relationship between the product of operating clearance and dynamic viscosity and the coefficient of friction.

Lubrication state is related to operating clearance and the dynamic viscosity of the grease base oil or lubricating oil. Thus, based on the results of the test described above, changes in coefficient of friction are plotted against the product (unit: mm$^2$/s) of [operating clearance (mm)/outer diameter (mm) of the concave portion on the outer circumference of the inner ring] and [grease base oil dynamic viscosity (mm²/s)] in FIG. 17. As shown in FIG. 17, the coefficient of friction reached its lowest value near 0.1, and increased both as the product increased and as it decreased. In order to stabilize the coefficient of friction at a low value, it is preferable that this product be within a range of 0.01-2 (mm²/s).

Examples 9 Through 13

Sliding bearings for use in food product machine applications were rated. The test bearing used for these examples was the sliding bearing having the configuration shown in FIG. 1, the outer ring being an injection-molded resin article, and the inner ring being a repurposed inner ring for a 6805 ball bearing and being a machined article (surface roughness Ra 0.03 μm) made of SUS 440C stainless steel. The primary dimensions were as follows.

Inner ring: ϕ 25×ϕ 27.5 (outer circumference concave portion)×7 mm
Outer ring: ϕ 27.78 (inner circumference convex portion)×ϕ 37×7 mm
Sliding contact radius: ϕ 27.5 mm The convex portions on the inner circumferences at the joints in the outer rings were not formed within ranges of ±10° with respect to the joints, and the two ends of the convex portions formed 45° angles with respect to the tangent lines of the inner circumferences of the outer ring, as shown in FIGS. 2 and 5. The radius of curvature of the concavely curved surface on the outer circumference of the inner ring was R 1.785-1.81, the radius of curvature of the convexly curved surface on the inner circumference of the outer ring was 1.7-1.75, and the radii of curvature were such that that of the concavely curved surface on the outer circumference of the inner ring was greater than that of the concavely curved surface on the inner circumference of the outer ring. In addition, the joints in the outer rings were placed into an abutting state prior to testing, and the inner diameter of the convex portion was greater than the outer diameter of the concave portion on the outer circumference of the inner ring, the difference therebetween being 0.28 mm. Specifically, the difference in radius was the operating clearance of the test bearing at room temperature, 0.28 mm (10/1000 of the outer diameter of the concave portion on the outer circumference of the inner ring).

The outer ring was an injection-molded article of synthetic resin, and the convexly curved surface on the inner circumference of the outer ring had an uncurved surface portion formed along the entire circumference of the center of the axial direction, on which a parting line was formed. In examples 12 and 13, 0.3 g of a grease containing a poly-alpha-olefin oil (Lucant™ HC600; Mitsui Chemicals, Inc.) as a base oil and polyurea as a thickener was applied to the uncurved surface portions. The composition (in terms of volume %) of the resin materials used for the outer ring are shown in Table 5. The raw materials were as discussed above.

<Friction Wear Test>

Friction wear testing conditions are shown in Table 6. Using a radial testing device, the coefficient of friction of the test bearing was measured. The test bearing was mounted to a specialized housing, in which state the counterpart shaft was passed through the inner diameter, a load was placed on the lower part of the specialized housing, and the counterpart shaft was rotated. Coefficients of friction and wear levels after 20 hours are listed together in Table 5.

TABLE 5

| | Example | | | | |
|---|---|---|---|---|---|
| | 9 | 10 | 11 | 12 | 13 |
| Inner ring | SUS | SUS | SUS | SUS | SUS |
| Outer ring (compounding ratio vol %) | | | | | |
| PPS | 70 | — | — | 70 | — |
| PA6T | — | 100 | — | — | 100 |
| POM | — | — | 100 | — | — |
| PTFE | 30 | — | — | 30 | — |
| Lubricant | No | No | No | Yes | Yes |
| Coefficient of friction | 0.14 | 0.16 | 0.17 | 0.05 | 0.06 |
| Wear level (mm) | 0.05 | 0.06 | 0.06 | 0.02 | 0.03 |

TABLE 6

| Load | 280 N (surface pressure 1.5 Mpa) |
|---|---|
| Rotational speed | 115 min⁻¹ (10 m/min velocity) |
| Counterpart shaft | Aluminum alloy (A5052)/ surface roughness 0.5 μmRa |
| Temperature | Room temperature (25° C.) |
| Operating time | 20 hours |

The examples comprised only two parts, and had low friction and low wear, as shown in Table 5. In addition, manufacturing costs were half or less of those for ball bearings comprising large numbers of parts.

INDUSTRIAL APPLICABILITY

The sliding bearing according to the present invention is a sliding bearing that has fewer parts and a simpler structure than a ball bearing while exhibiting low friction torque and self-insulating effects, is easy to manufacture, is not affected in terms of friction wear properties by the texture or surface roughness of the counterpart roller or shaft, and is capable of tolerating moment loads. The sliding bearing has properties that strike a halfway point between a ball bearing and a conventional resin sliding bearing in terms of both friction torque and manufacturing costs, allowing the sliding bearing to be advantageously used as a sliding bearing used to support a heated roller, such as a fuser roller or a pressure roller, of a fuser unit or various rollers and shafts in a developer unit, photosensitive unit, transfer unit, paper ejector unit, paper feeder unit, or the like of an image forming apparatus such as a photocopier, a multifunction machine, a printer, or a FAX machine, or a sliding bearing used to support a belt-driving unit or the like for an ink cartridge carriage in an inkjet printer. The sliding bearing can also be advantageously used as a sliding bearing for supporting a rotary shaft in a food product machine used to mix, blend, heat, dry, chill, fill, wrap, store, or otherwise process raw food materials and finished (or semi-finished) food products. The sliding bearing can also be used as a replacement for a ball bearing or a conventional resin sliding bearing in various types of industrial machinery and apparatus, automobiles, and auxiliary electrical equipment, apart from a photocopier, multifunction machine, printer, FAX machine, or food product machine, if usage conditions (PV, temperature, etc.) permit.

EXPLANATION OF REFERENCE SYMBOLS AND NUMERALS 1, 1' Sliding bearing
2 Inner ring 2a Concavely curved surface
2b Convexly curved surface
2c Uncurved surface portion
2d Joint
2e Detent
2f Lubricant-retaining groove
3 Outer ring
3a Convexly curved surface
3b Joint
3c Uncurved surface portion
3d Lubricant-retaining groove
3e Detent
3f Flange
3g Concavely curved surface
4 Bearing hole
5 Fuser roller
6 Housing
7 Metal check ring
11 Sliding bearing
12 Inner ring
13 Outer ring
14 Food product processing machine
14a Casing
14b Inlet
14c Outlet
14d Bearing case
15 Rotary shaft
16 Screw blade
17 Retaining ring

The invention claimed is:

1. A radial sliding bearing comprising an inner ring made of melt-cast metal and an outer ring comprising an article molded from a resin composition,
characterized in that the inner ring has a concavely curved surface and a non-concavely curved surface on the outer circumference,
the outer ring has a convexly curved surface and a non-convexly curved surface on the inner circumference, and
the inner ring and the outer ring relatively rotate with the convexly curved surface contacting and sliding against the concavely curved surface and with the non-convexly curved surface not contacting the non-concavely curved surface, and
wherein said article is molded from a resin composition is an annular article having a joint in at least one location.

2. The sliding bearing according to claim 1, characterized in that the inner ring has a bearing hole for mating with a support shaft on the inner circumference.

3. The sliding bearing according to claim 1, characterized in that a convex portion constituting the convexly curved surface is not formed within a range of ±10° with respect to the joint.

4. The sliding bearing according to claim 1, characterized in that the surface roughness of the concavely curved surface is no more than 0.3 μm Ra.

5. The sliding bearing according to claim 1, characterized in that the melt-cast metal is high-carbon chromium bearing steel, chromium-molybdenum steel, machine frame carbon steel, or stainless steel.

6. The sliding bearing according to claim 1, characterized in that a base resin of the resin composition is at least one synthetic resin selected from thermoplastic polyimide resin, polyether ketone resin, polyether ether ketone resin, polyether ketone etherketone ketone resin, polyphenylene sulfide resin, polyamide imide resin, polyamide resin, polyethylene resin, and polyacetal resin.

7. The sliding bearing according to claim 1, characterized in that the resin composition contains polytetrafluoroethylene resin.

8. The sliding bearing according to claim 1, characterized in that the resin composition contains at least one selected from carbon fibers, aramid fibers, whiskers, mica, graphite, and talc.

9. The sliding bearing according to claim 1, characterized in that the resin composition contains electroconductive carbon, and the volume resistivity of the article molded from a resin composition is less than $1\times10^6$ Ω·cm.

10. The sliding bearing according to claim 1, characterized in that the convexly curved surface has an uncurved surface portion formed along the entire circumference of an axial-direction center of the convexly curved surface.

11. The sliding bearing according to claim 10, characterized in that said article molded from a resin composition is an injection-molded article, and an injection molding parting line being formed on the uncurved surface portion.

12. The sliding bearing according to claim 1, characterized in that a lubricant is disposed between sliding surfaces of the inner ring and the outer ring.

13. The sliding bearing according to claim 12, characterized in that a lubricant-retaining groove constituted by an axial-direction indentation is formed in at least one location on a load-bearing portion of the article molded from a resin composition.

14. The sliding bearing according to claim 12, characterized in that the lubricant is at least one grease selected from fluorinated grease, urea grease, and lithium grease.

15. The sliding bearing according to claim 1, characterized in that the inner ring comprises a raised detent and the outer ring comprises a recessed detent and a flange.

16. The sliding bearing according to claim 1, characterized in that the melt-cast metal is stainless steel, and the sliding bearing is used in a food product machine.

17. An image forming apparatus characterized in being provided with the sliding bearing according to claim 1 and having a roller or shaft supported by the sliding bearing.

* * * * *